(12) United States Patent
Mori et al.

(10) Patent No.: US 7,243,754 B2
(45) Date of Patent: Jul. 17, 2007

(54) PEDESTRIAN AIRBAG SYSTEM

(75) Inventors: Kenji Mori, Aichi (JP); Atsushi Nagata, Aichi (JP); Yuji Sato, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 262 days.

(21) Appl. No.: 11/079,469

(22) Filed: Mar. 15, 2005

(65) Prior Publication Data

US 2005/0205333 A1 Sep. 22, 2005

(30) Foreign Application Priority Data

| Mar. 17, 2004 | (JP) | ................................ 2004-076127 |
| Mar. 23, 2004 | (JP) | ................................ 2004-084719 |
| Mar. 30, 2004 | (JP) | ................................ 2004-099296 |
| Mar. 30, 2004 | (JP) | ................................ 2004-099315 |
| May 31, 2004  | (JP) | ................................ 2004-161932 |

(51) Int. Cl.
*B60R 21/34* (2006.01)

(52) U.S. Cl. ..................................................... 180/274

(58) Field of Classification Search ................ 180/274; 280/730.1; 296/187.04; *B60R 21/34*
See application file for complete search history.

(56) References Cited

U.S. PATENT DOCUMENTS

| 6,827,170 | B2 * | 12/2004 | Hamada et al. | .............. 180/274 |
| 6,857,495 | B2 * | 2/2005 | Sawa | .......................... 180/274 |
| 2003/0062208 | A1 * | 4/2003 | Hamada et al. | .............. 180/274 |
| 2004/0262894 | A1 * | 12/2004 | Kempf | ..................... 280/730.1 |

FOREIGN PATENT DOCUMENTS

| JP | A-H07-125607 | 5/1995 |
| JP | A-2003-89333 | 3/2003 |
| JP | A-2003-306101 | 10/2003 |
| JP | A-2004-90795 | 3/2004 |

\* cited by examiner

*Primary Examiner*—Paul N. Dickson
*Assistant Examiner*—Robert A. Coker
(74) *Attorney, Agent, or Firm*—Posz Law Group, PLC

(57) ABSTRACT

A pedestrian airbag system according to the present invention includes a hood panel and an airbag which is folded and accommodated in a position downwardly of the rear end portion of the hood panel and which is adapted to be deployed and inflated upward by allowing inflation gas to flow therein. The hood panel includes an outer panel on the upper surface side and an inner panel disposed below the outer panel and set to have higher rigidity than the outer panel for supporting the outer panel, both panels formed of sheet metal. A storage portion for accommodating the airbag is formed from the outer panel near the rear end.

2 Claims, 26 Drawing Sheets

PEDESTRIAN AIRBAG SYSTEM

The present application claims priority to Japanese patent application of Mori et al., filed Mar. 17, 2004, No. 2004-76127, and Japanese patent application of Mori et al., filed Mar. 23, 2004, No. 2004-84719, and Japanese patent application of Mori et al., filed Mar. 30, 2004, No. 2004-99296, and Japanese patent application of Mori et al., filed Mar. 30, 2004, No. 2004-99315, and Japanese patent application of Nagata et al., filed May 31, 2004, No. 2004-161932, the entirely of each is hereby incorporated into the present application by this reference.

BACKGROUND OF THE INVENTION

1. Field of the Invention

The present invention relates to a pedestrian airbag system including a hood panel and an airbag to be accommodated in a position near the rear end thereof in a folded manner.

2. Description of the Related Art

In the related art, there exists a pedestrian airbag system which is disclosed in JP-A-2003-89333. In this airbag system, a case for accommodating an airbag to be disposed near the rear end of a hood panel is formed of synthetic resin and provided separately from the hood panel, and when the airbag is deployed and inflated, the airbag is adapted to be projected from an opening formed by breaking a part of the case.

However, in the pedestrian airbag system as set forth in the above-described patent publication, when the airbag is projected upward at the initial stage of airbag inflation, the case cannot resist a reaction force exerted to the case, and hence there exists a problem in stabilizing the direction of projection of the airbag. This is because the entire case for accommodating the airbag is formed of synthetic resin.

There also exists a pedestrian airbag system disclosed in JP-A-2003-306101. In this airbag system as well, a case disposed near the rear end of a hood panel for accommodating an airbag is formed of synthetic resin. In the airbag system as disclosed in the above-described patent publication, the upper side of the case is fixed to the rear end side of the hood panel, and when the airbag is deployed and inflated, the airbag can be projected from an opening formed by breaking a part thereof. Therefore, in the same manner, when the airbag is projected upward at the initial stage of airbag inflation, the case cannot resist the reaction force exerted to the case, and hence there exists a problem in stabilizing the direction of projection of the airbag. This is because the case is fixed to the rear side of the hood panel at the upper side.

In addition, in the pedestrian airbag system disclosed in the latter patent publication described above, since the portion covering the opening which is opened when the airbag is deployed and inflated is formed of synthetic resin, a break appears between this and the sheet metal outer panel of the hood panel disposed therearound due to difference in material, whereby design of the portion near the mounting portion of the airbag system is deteriorated.

There also exists a pedestrian airbag system disclosed in JP-A-7-125607, in which a case accommodating an airbag and an inflator is disposed substantially at the center of the hood panel in the longitudinal direction. Normally, since the pedestrian airbag system is provided with a heavy inflator, the overall weight increases. Therefore, as in the related art, when the case accommodating the airbag and the inflator is mounted substantially at the center of the hood panel in the longitudinal direction, there arises a necessity to increase rigidity of the portion of the hood panel which supports the case, to allow the hood panel to receive the reaction force which is exerted downward when the airbag is projected upward in the initial stage of airbag inflation and still support the pedestrian airbag system with reliability. In particular, since the inflator is required to be fixed firmly, the hood panel must be given increased weight in order to increase rigidity of the portion for supporting the inflator.

In addition, as in the related art, in the case of the pedestrian airbag system having a structure in which the case which accommodates the airbag and the inflator is mounted substantially at the center of the hood panel in the longitudinal direction, the case vibrates significantly with the hood panel when the vehicle is traveling, and hence may collide with parts in an engine room disposed downwardly of the case. Therefore, in order to reduce vibrations of the case, it is necessary to increase rigidity of the portion of the hood panel for supporting the case.

There is also a pedestrian airbag system as disclosed in JP-A-2004-90795. In this airbag system, an opening for allowing an airbag to project is formed on an outer panel of a hood panel, and the opening is covered by a flap portion formed of the same sheet metal as the outer panel.

However, in the airbag system configured as described above, a break appears between the flap portion and the outer panel surrounding therearound, and hence design of the portion near the mounting portion of the airbag system is deteriorated.

SUMMARY OF THE INVENTION

It is a first object of the invention to provide a pedestrian airbag system which accommodates an airbag so that the direction of projection is stabilized.

It is a second object of the invention to provide a pedestrian airbag system in which increase in weight is controlled so that a case can be supported stably.

It is a third object of the invention to provide a pedestrian airbag system in which design of the mounting portion can be improved.

The first object of the invention can be achieved by the pedestrian airbag system of following structure.

The pedestrian airbag system includes
a hood panel and
an airbag folded and accommodated in a position downwardly of the portion near the rear end of the hood panel and is adapted to be deployed and inflated upward by allowing inflation gas to flow therein;
the hood panel including an outer panel on the upper side, and an inner panel disposed below the outer panel and having a higher rigidity than the outer panel for supporting the outer panel, both of which are formed of sheet metal, and
a storage portion for accommodating the airbag being formed by the outer panel at the portion near the rear end of the outer panel.

In the pedestrian airbag system in this arrangement, the airbag is accommodated in the storage portion formed by the outer panel formed of sheet metal. Therefore, in the initial stage of airbag inflation, the reaction force generated when the airbag projects upward can be received by the storage portion. As a consequence, the direction of projection of the airbag can be stabilized. In the pedestrian airbag system in this arrangement, the inner panel having a higher rigidity than the outer panel is disposed below the outer panel. Therefore, even when the storage by itself cannot resist the reaction force of the airbag, the reaction force generated when the airbag projects can be adequately received by the inner panel which supports the outer panel.

Therefore, in the pedestrian airbag system in this arrangement, the airbag can be accommodated so that the direction in which the airbag projects is stabilized.

In the pedestrian airbag system in this arrangement, since the storage portion for accommodating the airbag is formed by the outer panel, it is not necessary to separately provide a case to accommodate the airbag. Therefore, increase in number of parts for the pedestrian airbag system can be restrained.

In the pedestrian airbag system in this arrangement, preferably, a reinforcing rib formed substantially into a U-shape in cross section is disposed at the periphery of the inner panel so as to project downward, and the storage portion is disposed in proximity to the reinforcing rib.

In the pedestrian airbag system in this arrangement, the reaction force generated when the airbag projects upward can be absorbed reliably by the reinforcing rib on the inner panel and so is advantageous.

In the pedestrian airbag system in this arrangement, it is preferable to form the storage portion substantially into a bottomed box-shape having an opening on top, including a side wall portion which is substantially a square tube aligned vertically, and a bottom portion for closing the lower end of the side wall portion, and to form a number of holes in the side wall portion for absorbing energy of impact force when the impact force directed downward from above is exerted, and allowing the side wall portion to plastically deform.

With the pedestrian airbag system in this arrangement, even when an obstacle such as a pedestrian collides with the portion near the storage portion, the impact energy can be absorbed by plastically deforming the side wall portion, which is advantageous.

In the pedestrian airbag system in this arrangement, when a through-hole is provided on the bottom wall portion of the storage, even when rain water or the like enters the storage portion, the rain water can be discharged out of the storage portion through the through-hole, and hence rain water is preferably prevented from accumulating in the storage portion.

The first object of the invention may be achieved by the pedestrian airbag system of the following structure.

The pedestrian airbag system includes:
a hood panel formed of sheet metal;
an airbag accommodated in a folded manner in a position near the rear end of the hood panel so as to be capable of deploying and being inflated upward by allowing inflation gas to flow therein; and
a case for accommodating the airbag;
wherein the case is accommodated in a storage recess formed by depressing the portion of the hood panel at the rear end downward so that the portion opens up above and to the rear at least, and with the bottom portion of the storage recess supporting the bottom of the case.

In the pedestrian airbag system in this arrangement, the case accommodating the airbag is accommodated in the storage recess formed by depressing the portion on the rear end of the hood panel downward so that the portion opens up above and to the rear at least, and with the bottom of the case supported by the bottom of the recess. Therefore, in the initial stage of airbag inflation, the reaction force generated when the airbag projects upward can be received by the bottom of the storage recess which supports the bottom of the case. The storage recess has rigidity, whereby the direction in which the airbag projects can be stabilized.

Therefore, with the pedestrian airbag system in this arrangement, the airbag can be accommodated so that the direction of projection is stabilized.

Since the pedestrian airbag system in this arrangement has such a structure that the case is accommodated in the storage recess formed by depressing the portion of the rear end of the hood panel with the lower surface side of the case supported by the storage recess, it is not necessary to provide a member for supporting the case separately, and hence increase in number of parts can be restrained.

In the pedestrian airbag system in this arrangement, in the case of the structure in which the hood panel includes an outer panel on the upper surface side and an inner panel which is disposed below the outer panel, and has a higher rigidity than the outer panel for supporting the outer panel, both of which are formed of sheet metal, a storage portion is preferably formed by depressing the outer panel and the inner panel together. This is because the reaction force generated when the airbag projects can be received reliably by the inner panel having a higher rigidity.

The first object of the invention can be achieved by the pedestrian airbag system having a structure as follows.

The pedestrian airbag system includes
a hood panel, and
an airbag accommodated in the position downwardly of the rear end portion of the hood panel in a folded manner, and deployed and inflated upward by allowing inflation gas to flow therein;
the hood panel includes an outer panel on the upper surface side and an inner panel disposed below the outer panel, and are both formed of sheet metal,
a reinforcing rib formed substantially into a U-shape in cross section is provided on the periphery of the inner panel so as to project downward, and
the airbag is accommodated in the recess of the U-shape cross section of the reinforcing rib at the rear portion of the hood panel.

In the pedestrian airbag system in this arrangement, the airbag is adapted to be accommodated in the reinforcing rib formed on the inner panel. Therefore, in the initial stage of airbag inflation, the reaction force generated when the airbag projects upward can be received by the rigid reinforcing rib on the inner panel, whereby the direction in which the airbag projects can be stabilized.

Therefore, with the pedestrian airbag system in this arrangement, the airbag can be accommodated so that the direction of projection is stabilized.

In the pedestrian airbag system in this arrangement, normally, the airbag is accommodated in the reinforcing rib disposed on the inner panel comprising the hood panel of a vehicle. Therefore, it is not necessary to additionally provide a space for accommodating the airbag below the hood panel, and so the airbag can be installed easily in a vehicle which is not originally configured to carry an airbag, without significant modification of the design.

In the pedestrian airbag system in this arrangement, in the case of a structure in which the airbag is accommodated in a case which opens upward, the case is preferably formed integrally with the outer panel. This is because by doing so, accommodation of the airbag and inflators for supplying inflation gas to the airbag then need not be provided separately, whereby the number of parts of the airbag system can be reduced.

The second object of the invention can be achieved by the pedestrian airbag system with a structure as follows.

The pedestrian airbag system includes a hood panel formed of sheet panel, an airbag accommodated in a folded manner so as to be capable of deploying and being inflated upward by allowing inflation gas to flow therein, and an inflator for supplying inflation gas to the airbag;

the hood panel can be opened to the front side of the vehicle by being connected near the rear ends of the panel's lateral edges to the vehicle body by hinge devices, and the inflator is disposed at the portion near the hinge devices.

In the pedestrian airbag system in this arrangement, the inflator is disposed near the hinge devices for connecting the hood panel to the body side of the vehicle. The hood panel is connected to the vehicle body so as to be capable of opening and closing to the front by the use of the hinge devices, and the portions at the periphery of the hinge devices are adapted to be increased in rigidity in comparison with other portions of the hood panel. Therefore, in the pedestrian airbag system in this arrangement, in the initial stage of airbag inflation, the reaction force exerted downward by the inflator when the airbag projects upward can be received by the portions at the periphery of the hinge devices, whereby the inflator can be supported by the portions at the periphery of the hinge devices reliably. Even if the rigidity of the portions at the periphery of the hinge devices is not sufficient for supporting the inflator, and hence necessity to increase rigidity of these portions arises, the portions at the periphery of the hinge devices have a higher rigidity than other portions of the hood panel. Therefore, the quantity of a reinforcing member which must be disposed for increasing rigidity is less than where the case accommodating the airbag and the inflator is mounted substantially at the center of the hood panel in the longitudinal direction as in the related art. Consequently, increase in weight of the airbag system can be restrained.

In the pedestrian airbag system in this arrangement, the heavy inflator is disposed near the hinge devices on the rear end portion of the hood panel. Therefore, the case is prevented from significantly vibrating when the vehicle is traveling in comparison with the case in which the case accommodating the airbag and the inflators is mounted substantially at the center of the hood panel in the longitudinal direction.

Therefore, in the pedestrian airbag system in this arrangement, the case can be supported stably while restraining increase in weight of the system.

In the pedestrian airbag system in this arrangement, it is preferable that there are a portion of the airbag for covering the upper side of the inflator and a portion of the airbag for covering the upper sides of the hinge devices integrally formed with respect to each other, when the inflation is completed.

In the pedestrian airbag system in this arrangement, the upper side of the inflator and the upper sides of the hinge devices can be covered by one single airbag. Therefore, if the pedestrian collides with the hood panel near the inflator or the hinge devices, the pedestrian can be prevented from colliding with the rigid inflator or the hinge devices by the airbag which is completely inflated, whereby the pedestrian can be protected reliably.

The third object of the invention is achieved by the pedestrian airbag system in a structure as follows.

The pedestrian airbag system includes;

a hood panel formed of sheet metal;

an airbag disposed near the rear end of the hood panel and accommodated in a folded manner so as to be capable of deployment and inflation rearward and upward by allowing inflation gas to flow therein;

a case which opens on top for accommodating the airbag, and a cover portion formed integrally with the hood panel at the rear portion of the hood panel for covering the area above the case is disposed, a hinge portion is disposed on the front edge side of the cover portion, the cover portion has a structure capable of causing the airbag to project from the opening which is opened so as to separate from the upper end of the case by plastically deforming the hinge portion so that the rear edge side is opened upward when the airbag is deployed and inflated, the case is mounted and fixed to the portion of the hood panel at the periphery of the cover portion, and the bottom of the case is supported by a stopper extending from a part of the vehicle body disposed downwardly of the rear end of the hood panel at least when the airbag is deployed and inflated, thereby preventing downward movement.

In the pedestrian airbag system in this arrangement, the cover covering the area above the case is integrally formed with other portions of the hood panel via the hinge portion which can be plastically deformed. Therefore, there is no between the cover portion and the hood panel appearing on the outer surface of the hood panel, whereby design of the mounting portion of the pedestrian airbag system is improved.

In the pedestrian airbag system in this arrangement as well, the cover portion opens by plastically deforming the hinge portion so as to open the rear edge side upward when the airbag is deployed and inflated, so that the airbag projects from the opening opened so as to move apart from the upper end of the case. Although the pedestrian airbag system in this arrangement is configured in such a manner that the case for accommodating the airbag is mounted and fixed to the portion of the hood panel at the periphery of the cover portion, the case is supported at its bottom by the stopper extending from a part of the vehicle body, disposed downwardly of the rear end of the hood panel when the airbag is deployed and inflated. Therefore, even when a reaction force for pushing the case downward is generated when the airbag projects upward in the initial stage of inflation, the reaction force can be received by the stopper, and hence downward movement of the case can be prevented. Therefore, the direction in which the airbag projects can be stabilized, and the airbag can be deployed and inflated so as to protect the pedestrian without problem.

Therefore, in the pedestrian airbag system in this arrangement, design of the mounting portion can be improved.

In the pedestrian airbag system in this arrangement, preferably, the case is formed substantially into a bottomed box which opens on top, including side walls disposed substantially in the vertical direction and a bottom wall portion closing the lower end side of the side wall portion, and the rear wall portion of the side wall portion to the rear of the airbag is preferably formed to be plastically deformable so that the upper end side can be moved rearward when the airbag is deployed and inflated. This is because in such case, the opening formed when the cover portion is opened can be increased by the amount that the rear wall portion opens up.

DESCRIPTION OF THE PREFERRED EMBODIMENTS

Figure 1:
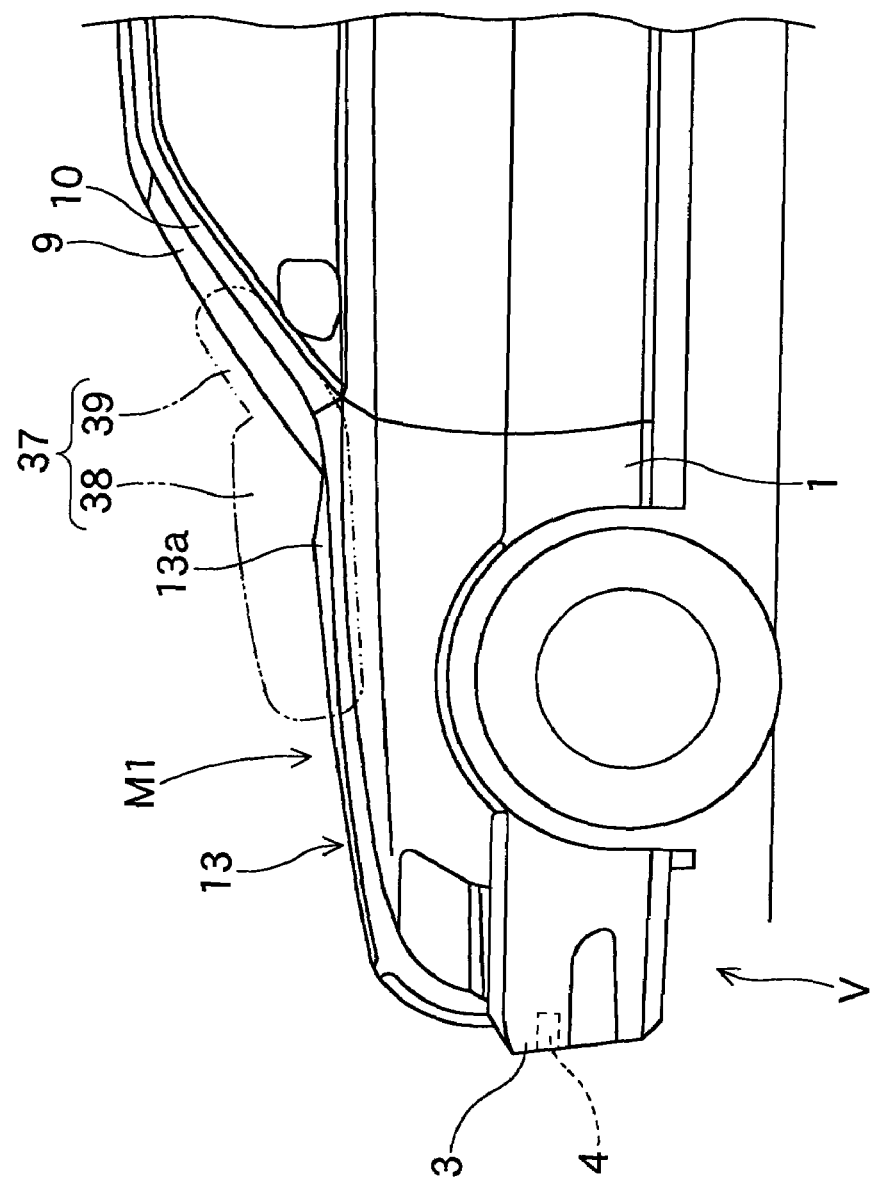
FIG. 1 is a side view of a vehicle on which a pedestrian airbag system according to a first embodiment of the invention is mounted.

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Referring now to the drawings, embodiments of the invention will be described. In this specification, directions of front and rear are based on the direction along the fore-and-aft direction of the vehicle, and left and right are based on the direction along the left and right direction when viewed rearward from the front.

Pedestrian airbag systems M1, M2 which can achieve a first object of the invention will be described now.

The pedestrian airbag system M1 according to the first embodiment includes a hood panel 13 and an airbag module 25 to be disposed near a rear end 13a of the hood panel 13 as shown in FIGS. 1 to 5.

Figure 2:
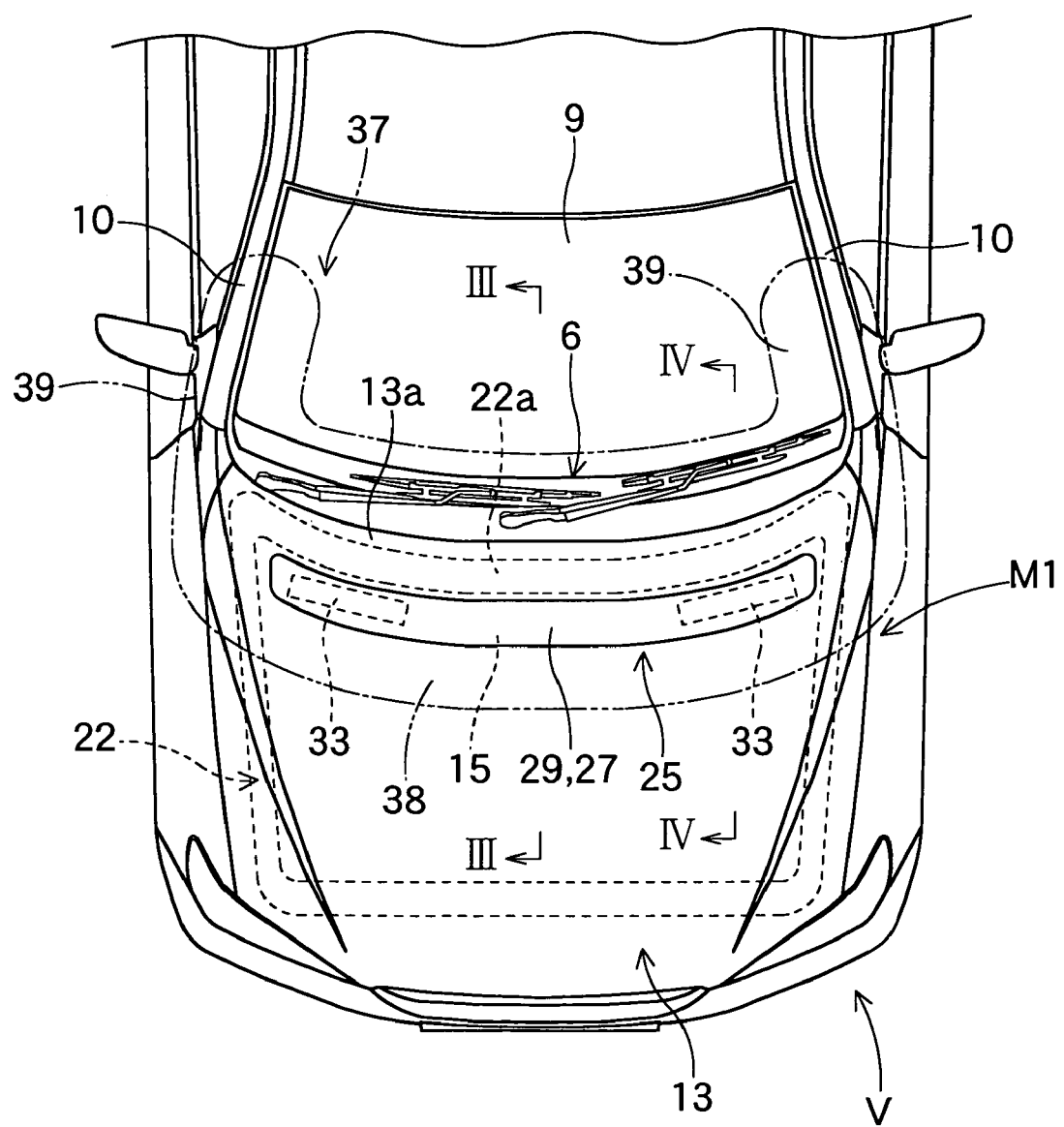
FIG. 2 is a plan view of the vehicle on which the pedestrian airbag system according to the first embodiment is mounted.

The hood panel 13 is disposed so as to cover the area above an engine room, not shown, in a vehicle V, as shown in FIGS. 1, 2. The hood panel 13 is connected at the position near the rear edge of the lateral ends thereof to a body 1 side of the vehicle V so as to be capable of opening and closing to the front using hinges, not shown. The hood panel 13 includes an outer panel 14 on the upper side and an inner panel 21 to be provided on the side of the lower surface of the outer panel 14, both formed of sheet metal. The outer panel 14 is adapted so as to sag easily when a colliding object such as a pedestrian collides from above. The inner panel 21 has higher rigidity than the outer panel 14, and has a structure to support the outer panel 14. A reinforcing rib 22 is disposed continuously along the circumference of peripheral edge of the inner panel 21 so as to secure rigidity. The reinforcing rib 22 is formed into a substantially U-shape in cross section projecting downward from the inner panel 21 (see FIGS. 2 to 4).

Figure 3:
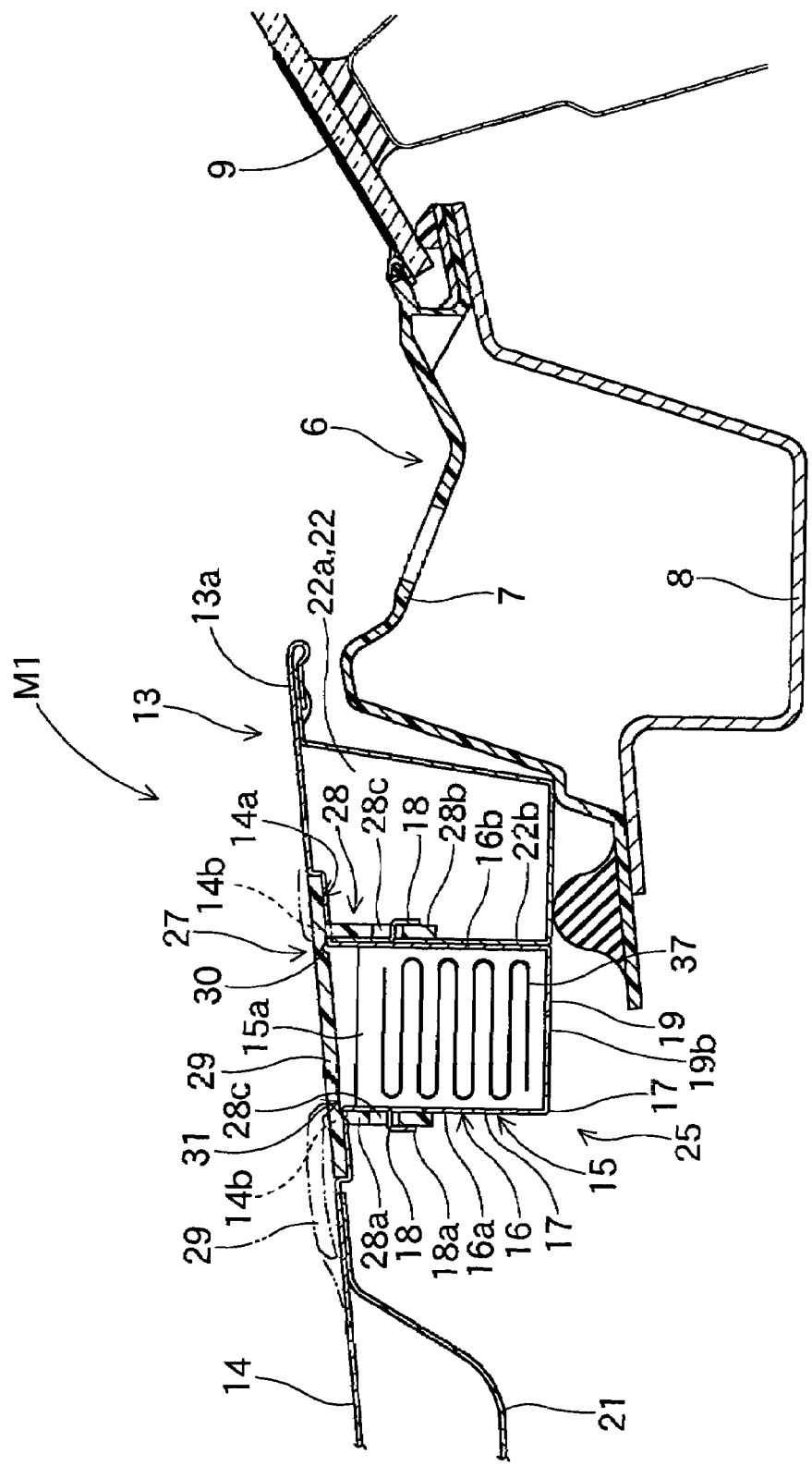
FIG. 3 is a schematic vertical cross-sectional view of the pedestrian airbag system according to the first embodiment taken along the fore-and-aft direction of the vehicle, which corresponds to III-III in FIG. 2.
Figure 4:
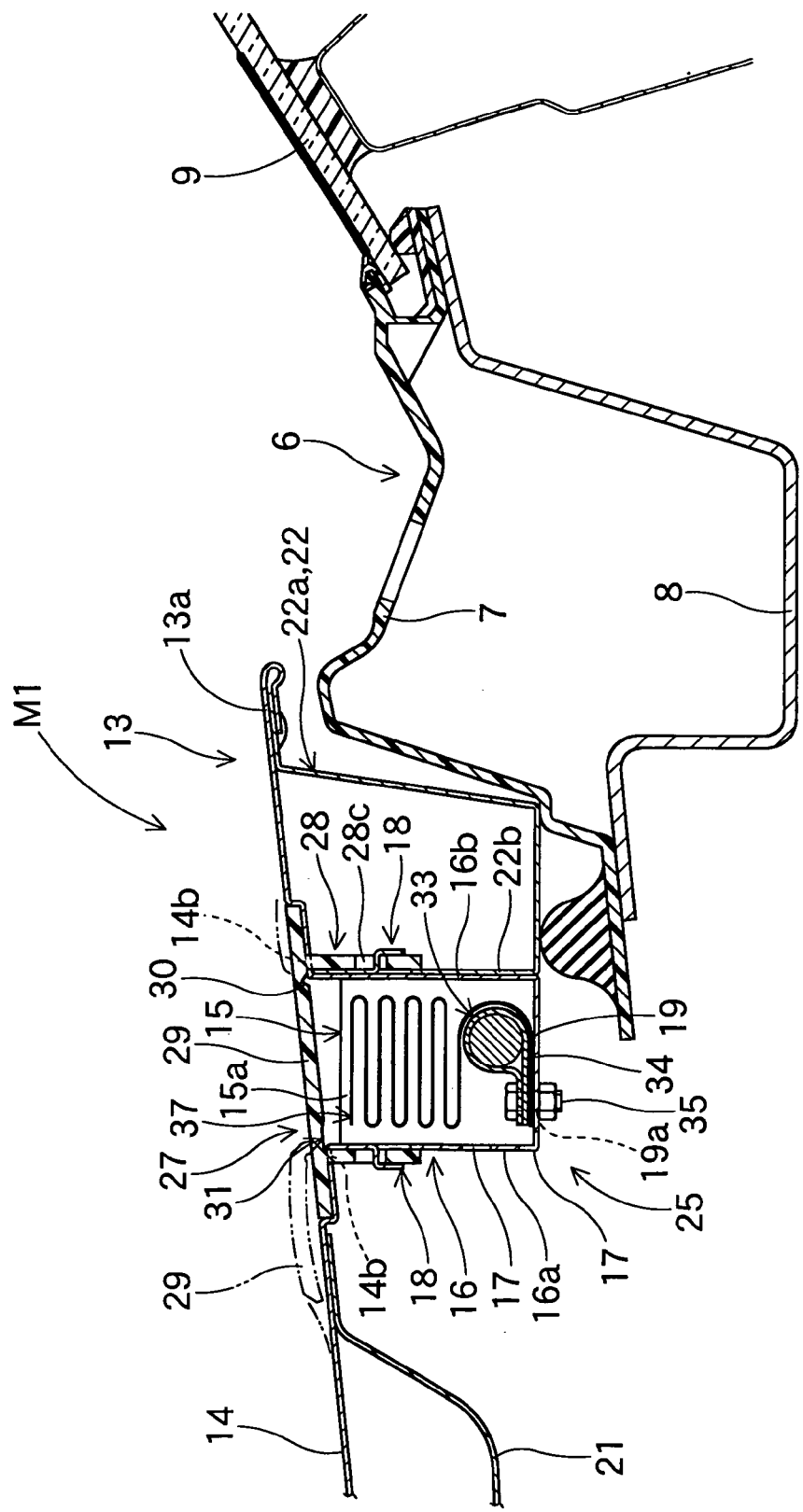
FIG. 4 is a schematic vertical cross-sectional view of the pedestrian airbag system according to the first embodiment taken along the fore-and-aft direction of the vehicle, which corresponds to IV-IV in FIG. 2.

The airbag module 25 includes, as shown in FIGS. 3, 4, an airbag 37, inflators 33 for supplying inflation gas to the airbag 37, a storage portion 15 for accommodating the folded airbag 37 and the inflators 33, and an airbag cover 27 for covering the area above the storage portion 15.

Figure 5:
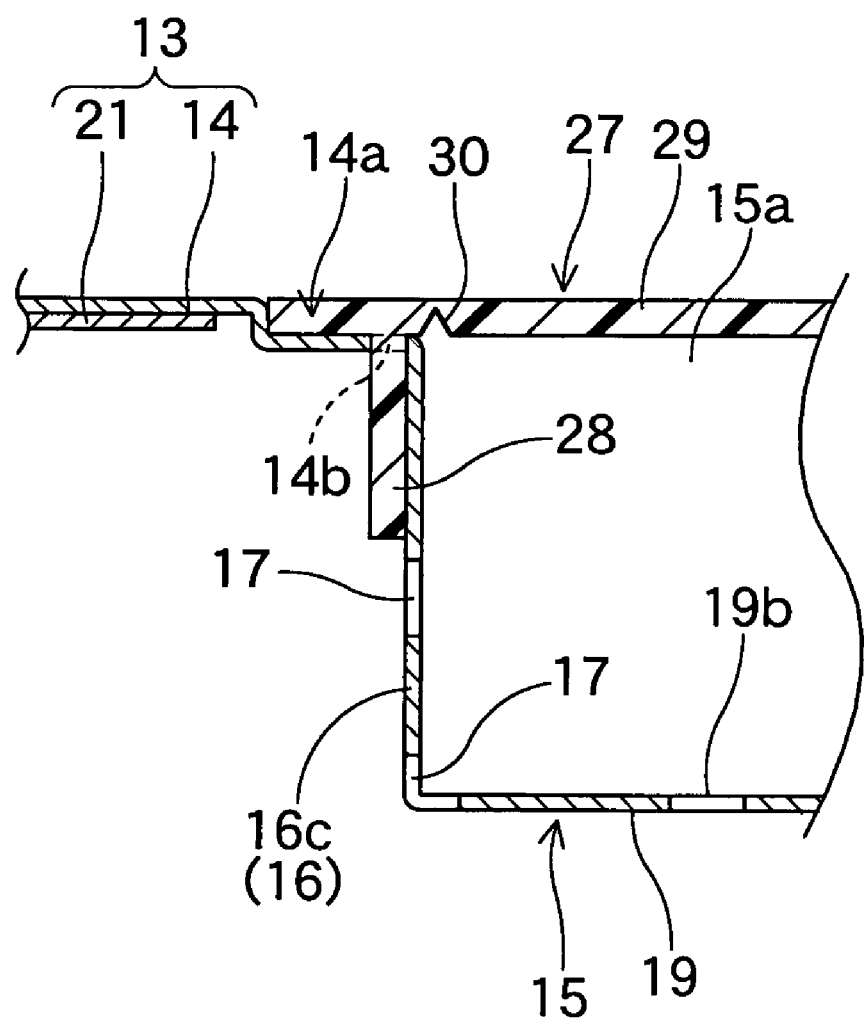
FIG. 5 is a schematic cross-sectional view showing a portion near the lateral ends of a storage in the pedestrian airbag system according to the first embodiment.

The storage portion 15 for accommodating the folded airbag 37 and the inflators 33 is disposed substantially over the entire lateral length near the rear end 13a of the hood panel 13, as shown in FIGS. 2 to 5. The storage portion 15 is formed by depressing the outer panel 14 so as to project downward, and is formed integrally with the outer panel 14. More specifically, the storage portion 15 is formed by depressing the outer panel 14 substantially into a bottomed box which is opened on top. The storage portion 15 includes a side wall portion 16 and a bottom wall portion 19. The side wall portion 16 is formed substantially into a square tube aligned along the vertical direction. The bottom wall portion 19 is disposed so as to close the lower end side of the side wall portion 16. An accommodating recess 14a capable of accommodating the airbag cover 27 is formed around an opening 15a of the storage portion 15 by depressing the outer panel 14. As shown in FIGS. 3 to 5, a plurality of insertion holes 14b are formed through storage recess 14a in the peripheral portion of the opening 15a of the storage portion 15. The insertion hole 14b is disposed so as to penetrate a side wall portion 28, described later, of the airbag cover 27.

The storage portion 15 is disposed so as to project downward through the inner panel 21. The storage portion 15 is disposed to contact with the front side of the rear portion 22a of the reinforcing rib 22 disposed on the inner panel 21. In this embodiment, the storage portion 15 has a structure in which the rear surface of a rear wall portion 16b of the side wall portion 16 is welded to the front surface of the rear portion 22a of the reinforcing rib 22. In the case of this embodiment, the storage portion 15 and the rear portion 22a of the reinforcing rib 22 are both formed so as to extend along the rear edge of the hood panel 13 parallel to a cowl 6 as shown in FIG. 2. The storage portion 15 and the rear portion 22a of the reinforcing rib 22 are curved so as to project forward at the lateral center when viewed from above.

The outer surface of a front wall portion 16a of the side wall portion 16 and the inner peripheral surface of a wall portion 22b to the front of the reinforcing rib 22 of the inner panel 21 disposed on the rear side of the rear wall portion 16b are formed with a plurality of engaging claws 18 so as to project therefrom. The engaging claws 18 are used for attaching the airbag cover 27 to the storage portion 15 (hood panel 13). The respective engaging claws 18 are formed by bending downward their distal ends 18a. The respective engaging claws 18 are configured so as to be capable of engaging the periphery of engaging holes 28c formed on the side wall portion 28 of the airbag cover 27. In this embodiment, the respective engaging claws 18 are formed by making cuts of a predetermined shape on the front wall portions 16a, 22b, and lifting the cut portions from the remaining front wall portions 16a, 22b so as to be integral with the front wall portions 16a, 22b (see FIGS. 3, 4). Also, the wall portions 16c disposed on the left and right sides and the front wall portion 16a disposed to the front of the side wall portion 16 are disposed with a number of holes 17 therethrough as shown in FIGS. 3 to 5. The holes 17 are formed so as to be capable of absorbing impact energy by plastically deforming the wall portions 16a, 16c when a colliding object such as the pedestrian collides with the portion near the storage portion 15 of the hood panel 13.

The bottom wall portion 19 is provided with insertion holes 19a as shown in FIG. 4. The insertion holes 19a are formed for inserting bolts 35 for mounting the inflators 33 in the storage portion 15. The bottom wall portion 19 is formed with a plurality of through holes 19b, as shown in FIGS. 3, 5. The through holes 19b are disposed for allowing rain water which enters the storage portion 15, to be discharged out of the storage portion 15, for preventing rain water accumulated in the storage portion 15.

The airbag cover 27 is formed of synthetic resin such as olefin thermoplastic elastomer. The airbag cover 27 is disposed so as to cover the opening 15a of the storage portion 15 on the area above the storage portion 15. In this embodiment, the airbag cover 27 is accommodated in the storage recess 14a disposed on the outer panel 14 so that the upper surface thereof is substantially flush with the surface of the surrounding outer panel 14. The airbag cover 27 includes side wall portions 28 and a flap portion 29 for covering the opening 15a of the storage portion 15. The side wall portions 28 are disposed on the outer periphery of the side wall portion 16 of the storage portion 15 so as to project downward. In this embodiment, a plurality of the side wall portions 28 are provided discontinuously in proximity to the outer periphery of the side wall portion 16 of the storage portion 15. The front wall portion 28a to be disposed to the front of the front wall portion 16a of the side wall portion 16 and the rear wall portion 28b disposed on the rear side of the rear wall portion 16b are each formed with engaging holes 28c. The engaging holes 28c are formed so as to allow the engaging claws 18 to engage. The airbag cover 27 is attached to the storage portion 15 (hood panel 13) by inserting the respective side wall portions 28 through the insertion holes 14b formed on the outer panel 14 and engaging a plurality of the engaging claws 18 which are disposed around the storage portion 15 with the peripheral edges of the engaging holes 28c.

The flap portion 29 is formed so as to match the opening 15a of the storage portion 15. In this embodiment, the flap portion 29 is, as shown in FIG. 2, curved so as to project at the lateral center thereof toward the front when viewed from above. The breakaway portion 30, which is breakable when the airbag 37 projects, is formed on the left, right and rear edges of the flap portion 29. On the front edge of the flap portion 29, a hinge portion 31 which serves as a center of rotation when opening is provided (see FIGS. 3 to 5).

In this embodiment, the inflators 33 are disposed at two positions, the left and right ends of the storage portion 15, as shown in FIG. 2. The respective inflators 33 are formed substantially into a cylindrical shape, and each have gas injection ports (not shown). The respective inflators 33 are connected to the airbag 37 so as to be capable of discharging inflation gas into the airbag 37. The inflators 33 are retained by brackets 34 formed of sheet metal as shown in FIG. 4. The respective inflators 33 are fixedly mounted to the storage portion 15 by fixing the brackets 34 to the bottom wall portion 19 of the storage portion 15 with the bolts 35.

Figure 6:
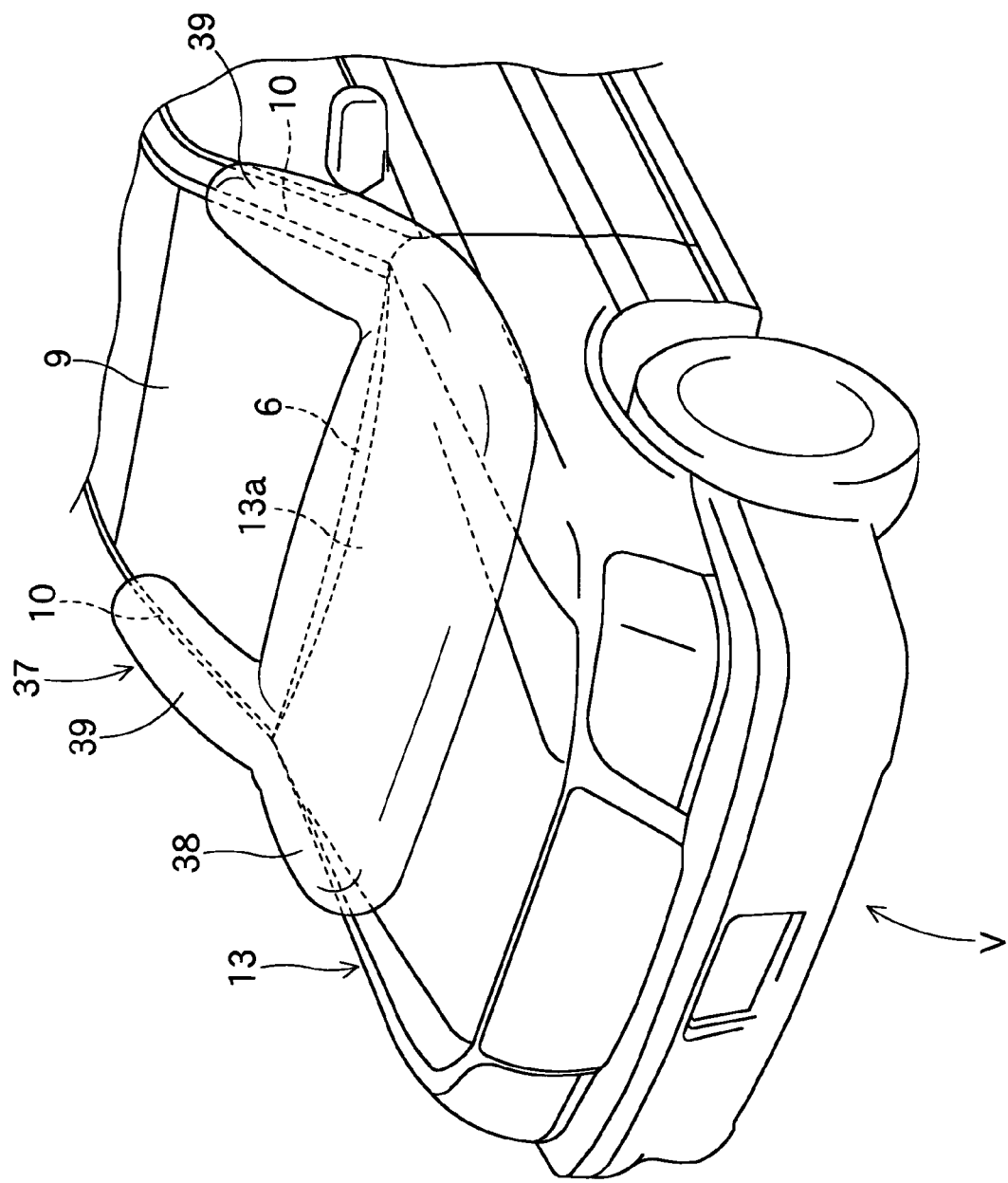
FIG. 6 is a perspective view of the vehicle in which inflation of the airbag is completed in the pedestrian airbag system according to the first embodiment.

The airbag 37 is deployed and inflated by being supplied therein with inflation gas injected from the inflators 33. In this embodiment, the airbag 37 is formed into a bag shape using textile fabric of polyester yarn or polyamide yarn or the like. The airbag 37 is, as shown in FIG. 4, fixedly mounted to the storage portion 15 with the inflators 33 using the bolts 35 for fixing the inflators 33. The airbag 37 has a substantially U-shape which is wide in the lateral direction when viewed from the front when it is completely inflated as shown by a chain double-dashed line in FIG. 2 and in FIG. 6. The airbag 37 includes a lateral inflated section 38 and the vertical inflated sections 39, 39. The lateral inflated section 38 is a portion to be disposed along the lateral direction. The vertical inflated sections 39, 39 are portions extending from left and right ends of the lateral inflated section 38 toward the rear so as to cover the front surfaces of front pillars 10. The lateral inflated section 38 is adapted so as to cover from the upper surface near the rear end 13a of the hood panel to the portion near the lower front surface of the front wind shield 9 substantially over the entire lateral length when the airbag 37 is completely inflated. Provided between the hood panel 13 and a front wind shield 9 is the cowl 6. The cowl 6 includes a cowl panel 8 and a cowl louver 7 to be disposed upwardly of the cowl panel 8. In other words, the lateral inflated section 38 of the airbag 37 is adapted to cover substantially the entire upper surface of the rear end 13a of the hood panel 13 and the cowl 6 when inflation is completed.

The vehicle V is provided with a sensor 4, as shown in FIG. 1, which can detect or predict collision with a pedestrian on a front bumper 3. In this embodiment, when an airbag activating circuit, not shown, supplies a signal detecting the collision with the pedestrian from the sensor 4, the inflators 33 are activated, so that the airbag 37 is deployed and inflated.

In the pedestrian airbag system M1 in this embodiment, when the operation signal is supplied to the inflators 33 of the airbag module 25 disposed at the rear end 13a of the hood panel 13, inflation gas is injected from the inflators 33. Accordingly, the airbag 37 is inflated while allowing inflation gas from the inflators 33 to flow therein. Subsequently, the flap portion 29 of the airbag cover 27 is pushed by the airbag 37 and opens toward the front of the vehicle V by breaking the breakaway portion 30. The airbag 37 projects upward from the opening 15a of the storage portion 15 formed when the flap potion 29 opens, and completes inflation as shown by chain double-dashed lines in FIGS. 1, 2 and in FIG. 6.

In the airbag system M1 according to the first embodiment, the airbag 37 of the airbag module 25 disposed near the rear end 13a of the hood panel 13 is accommodated in the storage portion 15 formed by the outer panel 14 of sheet metal. Therefore, in the initial stage of inflation of the airbag 37, a reaction force generated when the airbag 37 projects upward can be received by the storage portion 15. Consequently, the direction of projection of the airbag 37 can be stabilized. In the airbag system M according to the first embodiment, the inner panel 21 which is higher in rigidity than the outer panel 14 is disposed on the side of the lower surface of the outer panel 14. Therefore, even when the storage portion 15 cannot resist the reaction force of the airbag 37 by itself, the reaction force generated when the airbag 37 projects can be adequately received by the inner panel 21 which supports the outer panel 14.

Therefore, in the pedestrian airbag system M1 according to the first embodiment, the airbag 37 can be accommodated so that the direction of projection is stabilized.

In the pedestrian airbag system M1 according to the first embodiment, the reinforcing rib 22 formed on the inner panel 21 is contacted with the storage portion 15 on the vehicle rear. Therefore, the reaction force generated when the airbag 37 projects upward can be received adequately by the reinforcing rib 22 of the inner panel 21. When such a point need not be considered, it is not necessary to provide the storage portion 15 at a position adjacent to the reinforcing rib 22 of the inner panel 21, as a matter of course.

In addition, the pedestrian airbag system M1 according to the first embodiment, the storage portion 15 for accommodating the airbag 37 is formed from the outer panel 14. Therefore, it is not necessary to separately provide a case for accommodating the airbag 37, and hence increase in number of parts of the airbag module 25 can be restrained.

In the pedestrian airbag system M1 according to the first embodiment, a number of the holes 17 are formed through the front wall portion 16a and the left and right wall portions 16c of the side wall portion 16 disposed substantially along the vertical direction in the storage portion 15. Therefore, even when a colliding object such as the pedestrian collides with the portion near the storage portion 15 of the hood panel 13, impact energy can be absorbed by plastically deforming the wall portions 16a, 16c. Disposed downwardly of the storage portion 15 are rigid members such as the cowl panel 8 or a cylinder head cover of the engine, not shown, disposed close by in the engine room. Therefore, in the airbag system M1 according to the first embodiment, when the impact force directed downward from above is exerted to the portion near the storage portion 15, the storage portion 15 moves slightly downward upon reception of the impact force, and the lower side of the storage portion 15 is supported by the cowl panel 8 or a rigid member in the engine room. Then, when an impact is exerted, the storage portion 15 is supported at the lower side of the bottom wall 19 by the cowl panel 8 or the member in the engine room, and is plastically deformed so as to displace the upper edges of the wall portions 16a, 16c downward while absorbing energy generated when the impact force is exerted. Consequently, even when a colliding object such as a pedestrian collides with the hood panel 13 in the vicinity of the storage portion 15, the energy generated upon collision can be absorbed smoothly. When such a point need not be considered, it is also possible to use a storage portion having no hole on the side wall portion, as a matter of course.

In the airbag system M1 according to the first embodiment, a plurality of through holes 19b are formed on the bottom wall portion 19 of the storage portion 15. Therefore, even when rain water or the like enters into the storage portion 15, the rain water can be discharged from the through hole 19b to prevent the rain water from accumulating in the storage portion 15. When such a point need not be considered, a structure in which no through hole is provided on the bottom wall portion of the storage may be employed, as a matter of course.

Figure 7:
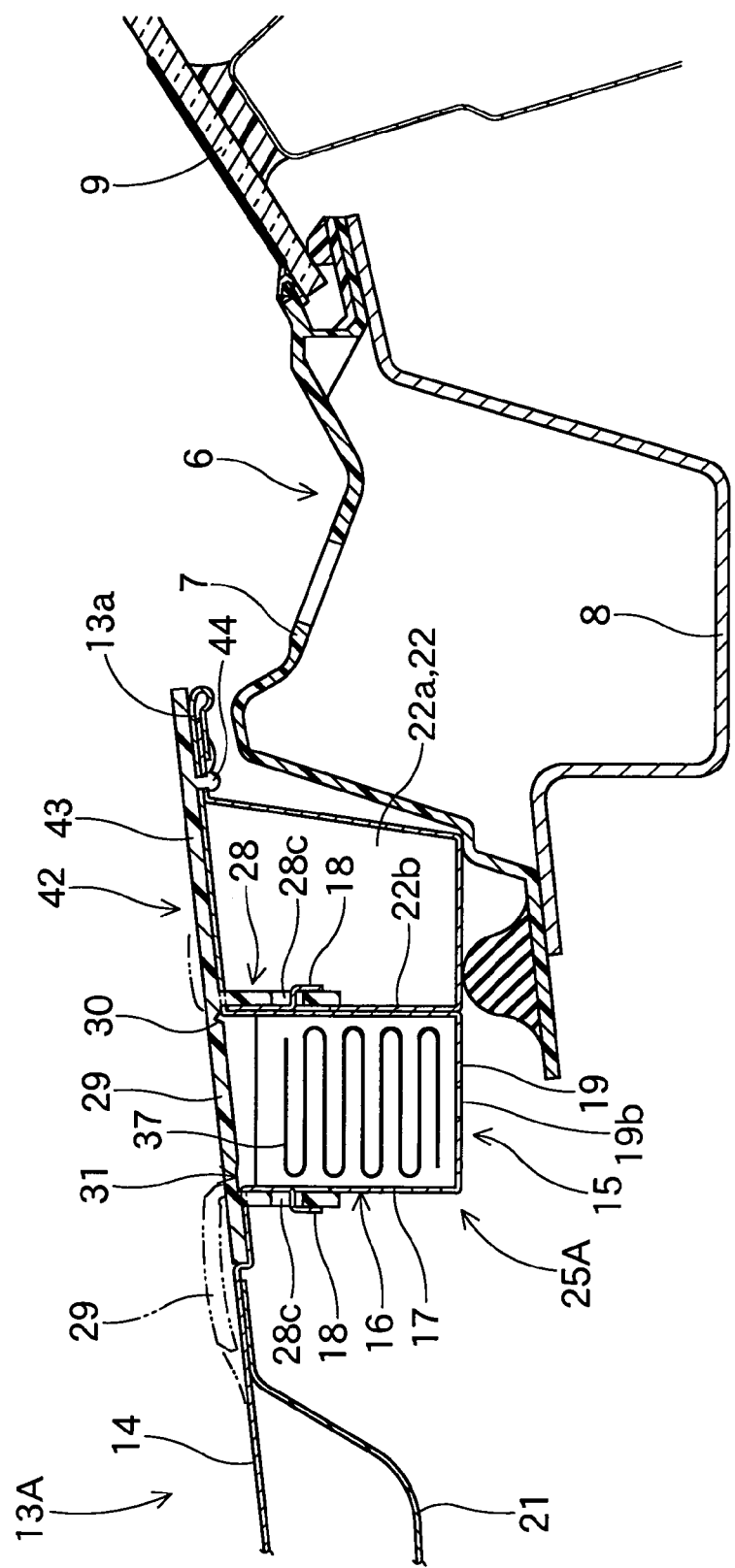
FIG. 7 is a schematic cross-sectional view showing a modification of the pedestrian airbag system according to the first embodiment taken along the fore-and-aft direction of the vehicle.

It is also possible to employ the airbag system as shown in FIG. 7. In the airbag system shown in FIG. 7, an airbag cover 42 of a airbag module 25A is provided with an extended portion 43 disposed so as to extend from the flap portion 29 rearwardly of the vehicle and cover the rear end 13a of the hood panel 13A. The structures other than the extended portion 43 are the same as those of the aforementioned airbag system M1, and no description will be made again by designating the same reference numerals. An engaging clip 44 for engaging the extended portion 43 to the hood panel 13A projects downward from the portion near the rear end of the extended portion 43. A plurality of the engaging clips 44 are disposed along the lateral direction. In the airbag system of such a structure, the breaks between the airbag cover 42 and the hood panel 13A can be reduced in comparison with the airbag system M1 described above. This is because the extended portion 43 of the airbag cover 42 is disposed so as to cover up to the rear end 13a of the hood panel 13A. Therefore, design of the hood panel 13A can be improved.

Subsequently, the pedestrian airbag system M2 according to the second embodiment will be described. The pedestrian airbag system M2 according to the second embodiment includes a hood panel 113 and a airbag module 122 disposed near a rear end 113a of the hood panel 113 like the aforementioned airbag system M1.

Figure 8:
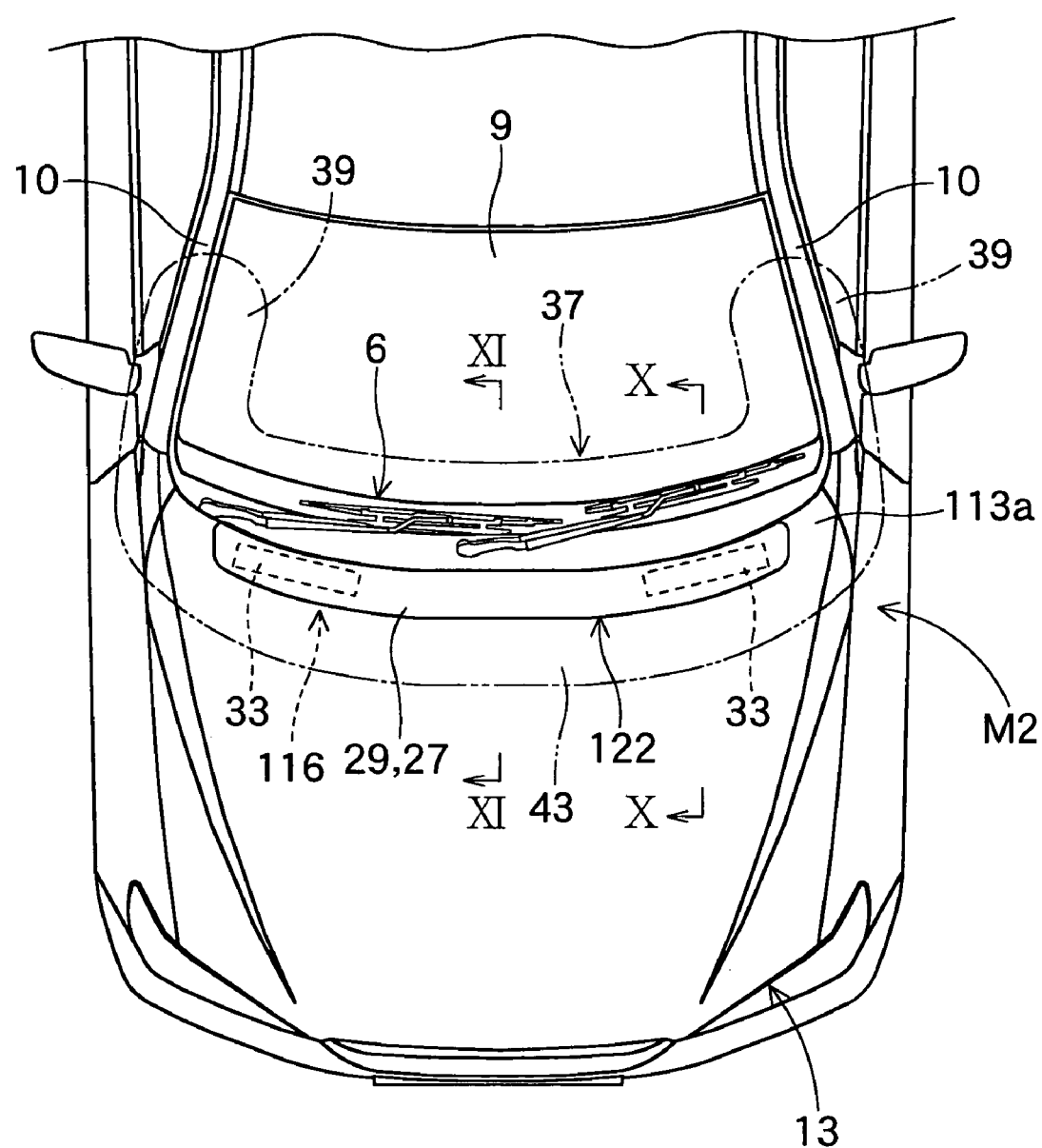
FIG. 8 is a plan view of a vehicle on which a pedestrian airbag system according to a second embodiment is mounted.
Figure 9:
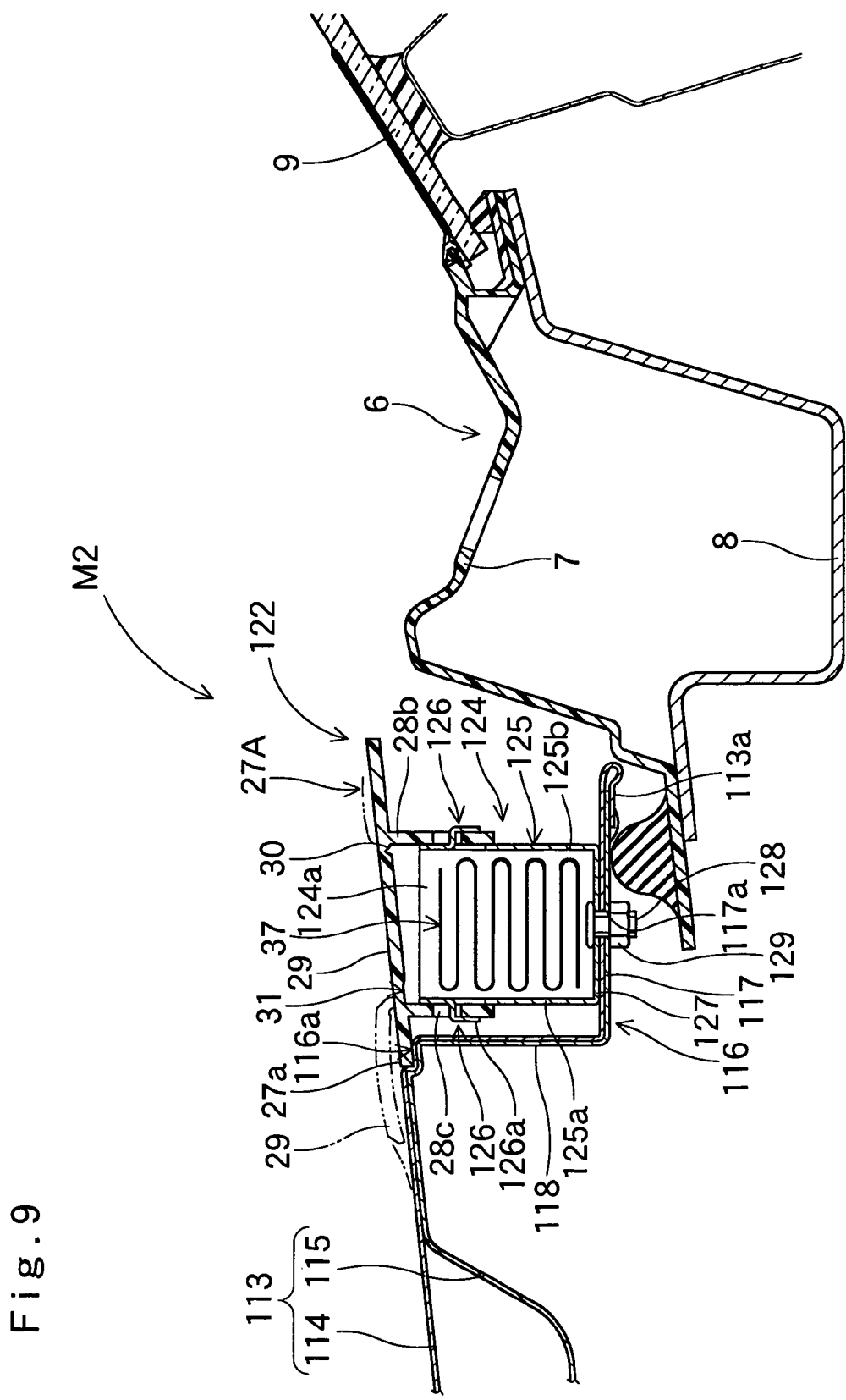
FIG. 9 is a schematic vertical cross-sectional view of the pedestrian airbag system according to the second embodiment taken along the fore-and-aft direction, which corresponds to IX-IX in FIG. 8.
Figure 10:
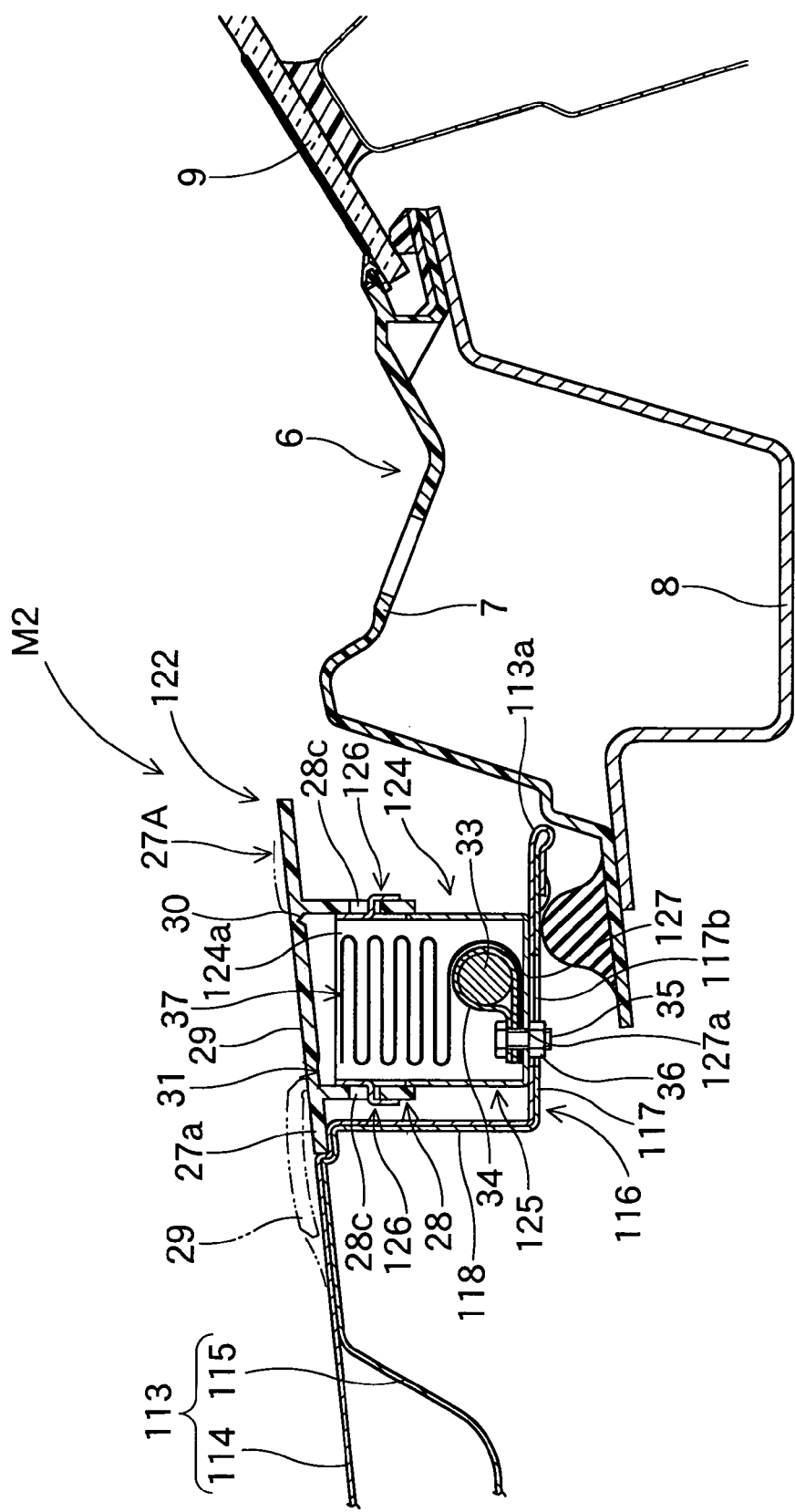
FIG. 10 is a schematic vertical cross-sectional view of the pedestrian airbag system according to the second embodiment taken along the fore-and-aft direction of the vehicle, which corresponds to X-X in FIG. 8.
Figure 11:
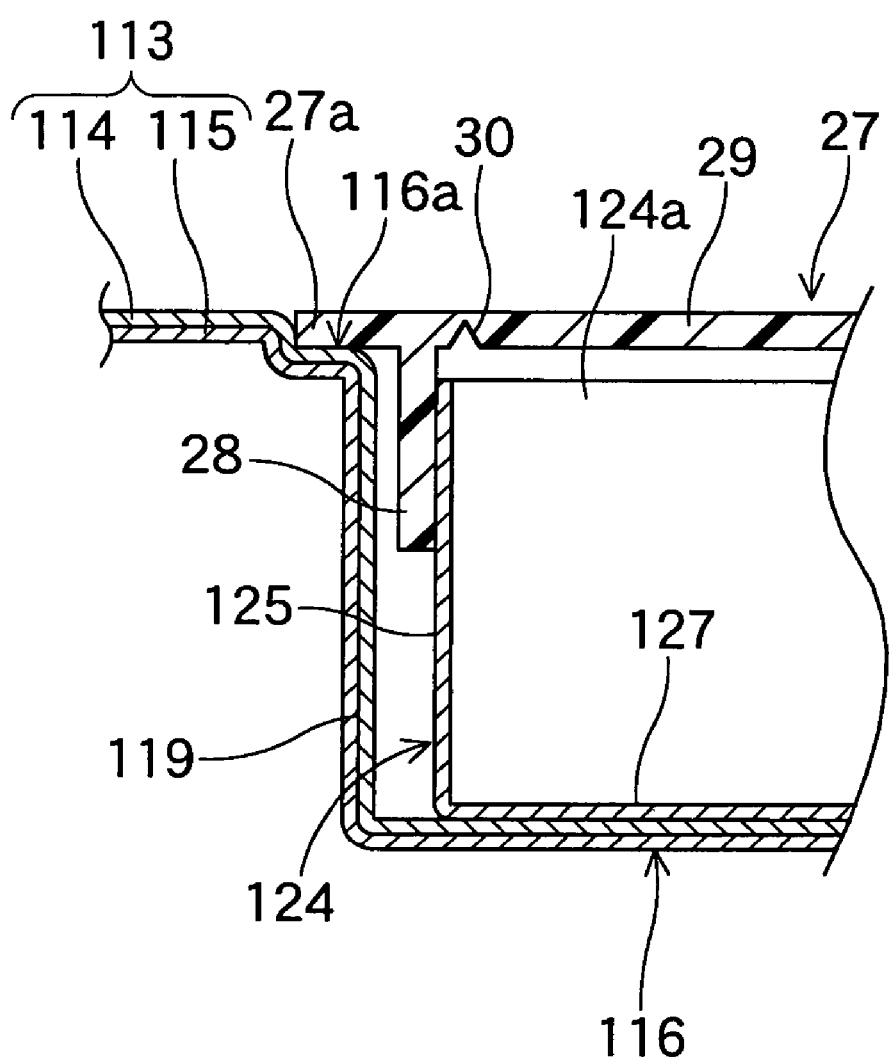
FIG. 11 is a schematic cross-sectional view showing a portion near the lateral ends of a case in the pedestrian airbag system according to the second embodiment.

The hood panel 113 is disposed so as to cover the area above the engine room, not shown, of the vehicle V as shown in FIG. 8, like the hood panel 13 in the aforementioned airbag system M1. The hood panel 113 is connected to the body 1 of the vehicle V near the rear of the lateral ends of the panel so as to be capable of opening and closing to the front using the hinges, not shown. The hood panel 113 includes an outer panel 114 and an inner panel 115 like the aforementioned hood panel 113. The hood panel 113 is provided with a storage recess 116 for accommodating the airbag module 122 on the rear end portion 113a of the hood. The storage recess 116 is formed by depressing the outer panel 114 and the inner panel 115 downward so as to open up above and to the rear. The storage recess 116 is, as shown in FIG. 8, disposed substantially over the entire length along the lateral direction of the hood panel 113. Then, the storage recess 116 includes a bottom wall portion 117, a front wall portion 118, and side wall portions 119 as shown in FIGS. 9 to 11. The bottom wall portion 117 is disposed so as to support the lower surface of the airbag module 122. The front wall portion 118 is disposed to the front of the airbag module 122. The side wall portions 119 are disposed at the lateral ends of the airbag module 122. In the case of this embodiment, the storage recess 116 is disposed so as to extend along the rear edge of the hood panel 113 parallel to the cowl 6. More specifically, the storage recess 116 is curved so as to project at the lateral center toward the front when viewed from above. A supporting recess 116a is formed around the opening on the area above the storage recess 116 (upper end side of the front wall portion 118 and the side wall portions 119) by depressing the outer panel 114 and the inner panel 115 (see FIGS. 9 to 11). The supporting recess 116a has a structure to accommodate periphery portions 27a of an airbag cover 27A at the periphery of the flap portion 29, and to be capable of supporting the lower side of the periphery portions 27a at the periphery of the flap portion 29.

The airbag module 122 is disposed so as to be supported at the bottom by the bottom wall portion 117 of the storage recess 116, as shown in FIGS. 8 to 11. The airbag module 122 includes the airbag 37, the inflators 33, a case 124, and the airbag cover 27A. The inflators 33 are adapted to supply inflation gas to the airbag 37. The case 124 accommodates the folded airbag 37 and the inflators 33. The airbag cover 27A covers the area above the case 124. The airbag module 122 has the same structure as the airbag module 25 in the aforementioned airbag system M1 except for the case 124. Therefore, the same parts are represented by the same reference numerals, and description will be omitted.

The case 124 is formed of sheet metal and is disposed substantially over the entire length of the hood panel 113 in the lateral direction as shown in FIGS. 8 to 11. The case 124 is curved so as to project at the lateral center thereof toward the front along the storage recess 116 when viewed from above. In this embodiment, the case 124 is formed substantially into a box shape including a side wall portion 125 which is substantially a square tube and a bottom wall portion 127 for closing the lower end of the side wall portion 125. The side wall portion 125 is opened on top and aligned substantially in the vertical direction.

On the outer surfaces of wall portions 125a, 125b opposed to each other at the front and rear of the side wall portion 125 of the case 124, a plurality of engaging claws 126 are formed so as to project therefrom. The engaging claws 126 are members for assembling the airbag cover 27A to the case 124. A plurality of the engaging claws 126 are provided on the front and rear wall portions 125a, 125b, respectively. The respective engaging claws 126 are bent so that their distal ends 126a point downward, so that the distal ends 126a can engage with the peripheral edges of the engaging holes 28c formed on the front and rear wall portions 28a, 28b of the airbag cover 27A. In this embodiment, the respective engaging claws 126 are formed integrally with the front and rear wall portions 125a, 125b by making cuts of a predetermined shape on the front and rear wall portions 125a, 125b, and lifting these cut portions away from the remaining front and rear wall portions 125a, 125b (see FIGS. 9, 10). The bottom wall portion 127 is disposed on the lower side of the folded airbag 27. The bottom wall portion 127 is formed with insertion holes 127a for the inserting bolts 35 for mounting the inflators 33 to the case 124 (see FIG. 10).

The case 124 is, in this embodiment, fixedly mounted to the bottom wall portion 117 of the storage recess 116 using a plurality of bolts 128 (in this embodiment, there are two bolts are disposed along the lateral direction although not shown in the drawing) disposed so as to project downward from the bottom wall portion 127 as shown in FIG. 9. In other words, in the airbag module 122 of this embodiment, the mounting bolt 128 projecting from the bottom wall portion 127 of the case 124 is first inserted into insertion holes 117a formed on the bottom wall portion 117 of the storage recess 116. Then, nuts 129 are tightened to the distal ends of the bolts 128 projected from the inner panel 115. Consequently, the airbag module 122 is accommodated in the storage recess 116 with the lower surface side of the bottom wall portion 127 of the case 124 supported by the bottom wall portion 117 of the storage recess 116. The bottom wall portion 117 of the storage recess 116 is formed with openings 117b at predetermined positions as shown in FIG. 10. The openings 117b are for inserting the bolts 35 and nuts 36 for fixing the inflators 33 to the bottom wall portion 127 of the case 124.

The airbag module 122 of this embodiment, the airbag cover 27A is formed so that the rear edge of the portion 27a at the periphery of the flap portion 29 is aligned with the rear edge 113a of the hood panel 113 when viewed from above, as shown in FIGS. 8 to 10.

The pedestrian airbag system M2 according to the second embodiment is mounted to the vehicle V in the following manner. The inflators 33 retained by the brackets 34 are connected to the folded airbag 37. Subsequently, the airbag 37 and the inflators 33 are accommodated in the case 124 from an opening 124a so that the bolts 35 are projected from the through holes 127a of the bottom wall portion 127. Then, the nuts 36 are tightened to the bolts 35 projecting from the bottom wall portion 127 of the case 124, so that the inflators 33 and the airbag 37 are fixedly mounted to the case 124. Subsequently, the airbag cover 27A is attached to the case 124 with the respective engaging claws 126 engaged with the peripheral edge of the engaging holes 28c to form the airbag module 122.

Then, the airbag module 122 is placed on the bottom wall portion 117 of the storage recess 116 so as to allow the bolts 128 to project from the through holes 117a formed on the bottom wall portion 117 of the storage recess 116. Then, by tightening the nuts 129 to the bolts 128 projecting from the bottom wall portion 117, the airbag module 122 can be fixedly mounted to the hood panel 113. Consequently, assemble of the airbag system M2 is achieved. Then, by fixing the airbag system M2 to the body 1 side of the vehicle V using the hinges, not shown, on the hood panel 113, the airbag system M2 can be mounted to the vehicle V.

In the pedestrian airbag system M2 according to the second embodiment, the airbag module 122 disposed near the rear end 113a of the hood panel 113 is accommodated in the storage recess 116 with the bottom surface side thereof supported by the bottom wall portion 117. Then, the storage recess 116 is formed by depressing the rear end portion of the hood panel 113 downward so as to open up above and to the rear. Therefore, in the initial stage of inflation of the airbag 37, the reaction force generated when the airbag 37 projects upward can be received by the bottom wall portion 117 of the storage recess 116 adapted to have rigidity, whereby the direction in which the airbag projects 37 can be stabilized.

Therefore, in the airbag system M2 according to the second embodiment, the airbag 37 can be accommodated so that the direction of projection is stabilized.

In the airbag system M2 according to the second embodiment, the storage recess 116 is formed by depressing the outer panel 114 and the inner panel 115 together. Therefore, the reaction force generated when the airbag 37 projects can be absorbed adequately by the inner panel 115 with high rigidity. When such a point need not be considered, the storage recess can be formed by depressing only the outer panel, as a matter of course.

In the airbag system M2 according to the second embodiment, the lower surface side of the airbag module 122 is supported by the bottom wall portion 117 of the storage recess 116 by accommodating the airbag module 122 in the storage recess 116 formed by depressing the rear end portion of the hood panel 113. Therefore, it is not necessary to separately provide a member for supporting the airbag module 122, whereby increase in number of parts can be restrained.

In the airbag system M2 according to the second embodiment, the storage recess 116 for accommodating the airbag module 122 is formed so as to open up above and to the rear. In other words, in the airbag system M2 according to the second embodiment, the airbag module 122 is disposed so as to cover the upper side of the rear edge of the hood panel 113. Therefore, when viewed from above, the rear edge of the hood panel 113 is aligned with the rear edge of the airbag module 122 (the rear edge of the airbag cover 27A). Consequently, the breaks between the airbag cover of the airbag module and the hood panel can be reduced in comparison with the case in which the storage recess is configured to only open up above. In other words, when forming the storage recess so as to only open up above, four boundary lines generated between the airbag cover of the airbag module and the hood panel therearound in front, rear, left and right around the entire circumference of the peripheral edge of the airbag cover. In contrast, in the airbag system M2 according to the second embodiment, the boundary lines generated between the airbag cover of the airbag module and the hood panel therearound can be reduced to three, that is, the front edge, and the left and right edges of the airbag cover 27A. Therefore, in the airbag system M2 according to the second embodiment, the design of the hood panel 113 can be improved.

In the airbag system M2 according to the second embodiment, the lateral width of the airbag module 122 is set to a smaller width than that of the rear end 113a of the hood panel in the lateral direction. It is also possible to mount a system which has substantially the same lateral width as that of the rear end 113a of the hood panel to the hood panel as a matter of course. In this arrangement, the storage recess of the hood panel for accommodating the airbag module is opened on the left and right sides as well. In the latter arrangement, the left and right edges of the airbag cover of the airbag module can be aligned with the left and right edges of the hood panel. Therefore, the boundary line generated between the airbag cover and the hood panel therearound can be reduced to only one, at the front edge of the airbag cover. In other words, in the pedestrian airbag system in this arrangement, the boundary portion between the airbag cover and the hood panel can further be reduced, and hence design of the hood panel can be further improved.

Subsequently, a pedestrian airbag system M3 according to a third embodiment, which can achieve the first and second objects of the invention will be described.

The pedestrian airbag system M3 according to the third embodiment includes a hood panel 213 and an airbag module 224 to be disposed near a rear end 213a of the hood panel 213 as in the airbag systems M1, M2 described above.

Figure 12:
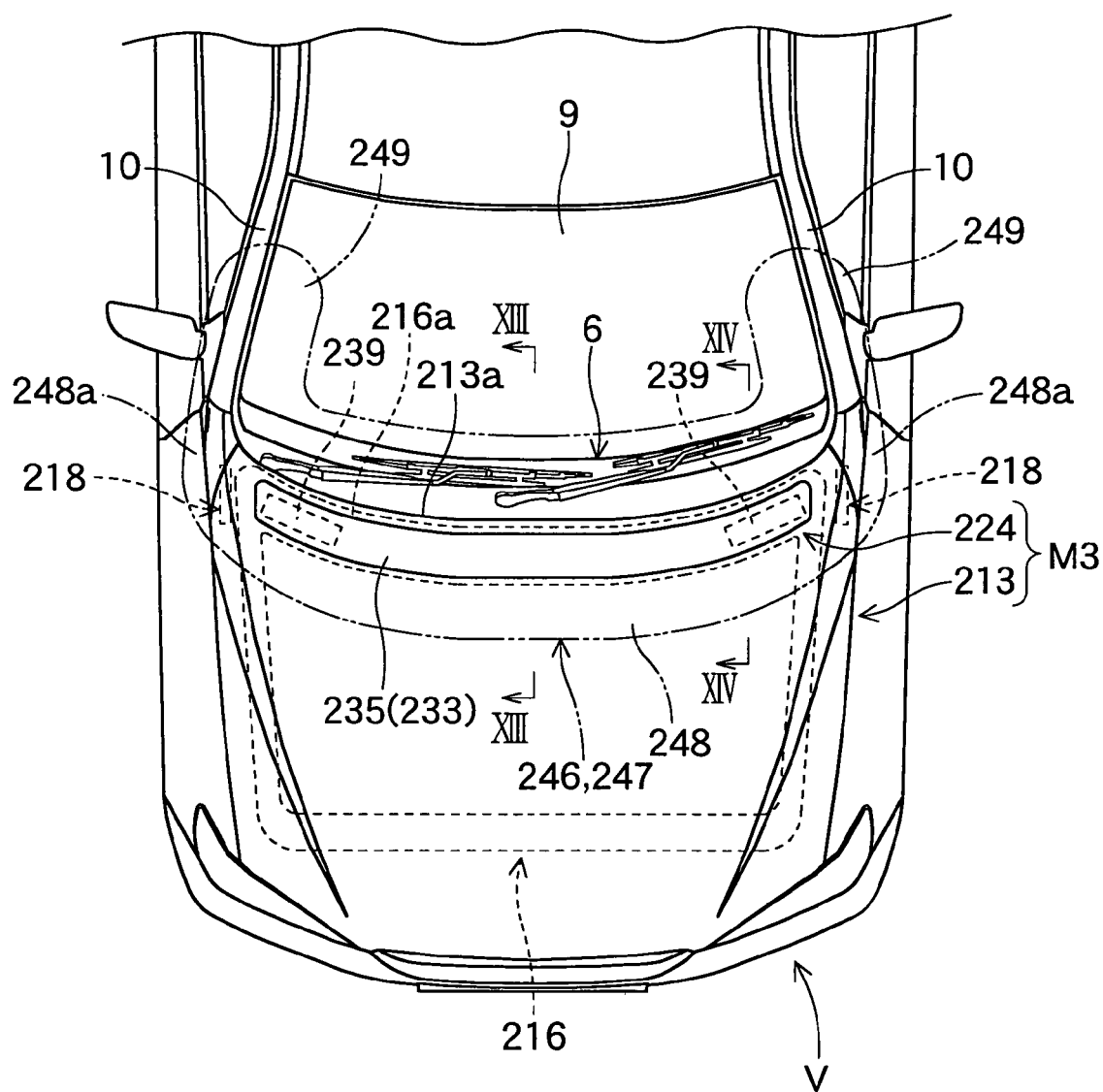
FIG. 12 is a plan view of a vehicle on which a pedestrian airbag system according to a third embodiment is mounted.

Hinge devices 218, 218 are provided near the rear end 213a of the hood panel 213 at the lateral ends thereof. The hinge devices 218, 218 are used for connecting the hood panel 213 to the body 1 side of the vehicle V. The hood panel 213 is configured to be connected to the body 1 of the vehicle V so as to be capable of opening and closing to the front using the hinge devices 218, 218 (see FIGS. 12, 16). The hood panel 213 includes an outer panel 214 and an inner panel 215 like the aforementioned hood panels 13, 113. The outer panel 214 is formed so as to sag easily when hit with a colliding object such as the pedestrian from above. The inner panel 215 is configured to be higher in rigidity than the outer panel 214, so as to be capable of supporting the outer panel 214. Provided at the periphery of the inner panel 215 is a reinforcing rib 216 extending continuously along the entire circumference thereof so as to be capable of securing rigidity. The reinforcing rib 216 is formed into a substantially U-shape in cross-section projecting from the inner panel 215 downward (see FIGS. 12 to 15). Provided at the rear end of the inner panel 215 is a reinforcing panel 215a for reinforcing the periphery of the hinges 218 (see FIGS. 15, 16). A rear portion 216a of the reinforcing rib 216 is formed so as to extend along the rear edge of the hood panel 213 parallel the cowl 6. More specifically, as shown in FIG. 12, the rear portion 216a is curved so as to project at the lateral center toward the front when viewed from above.

Figure 15:
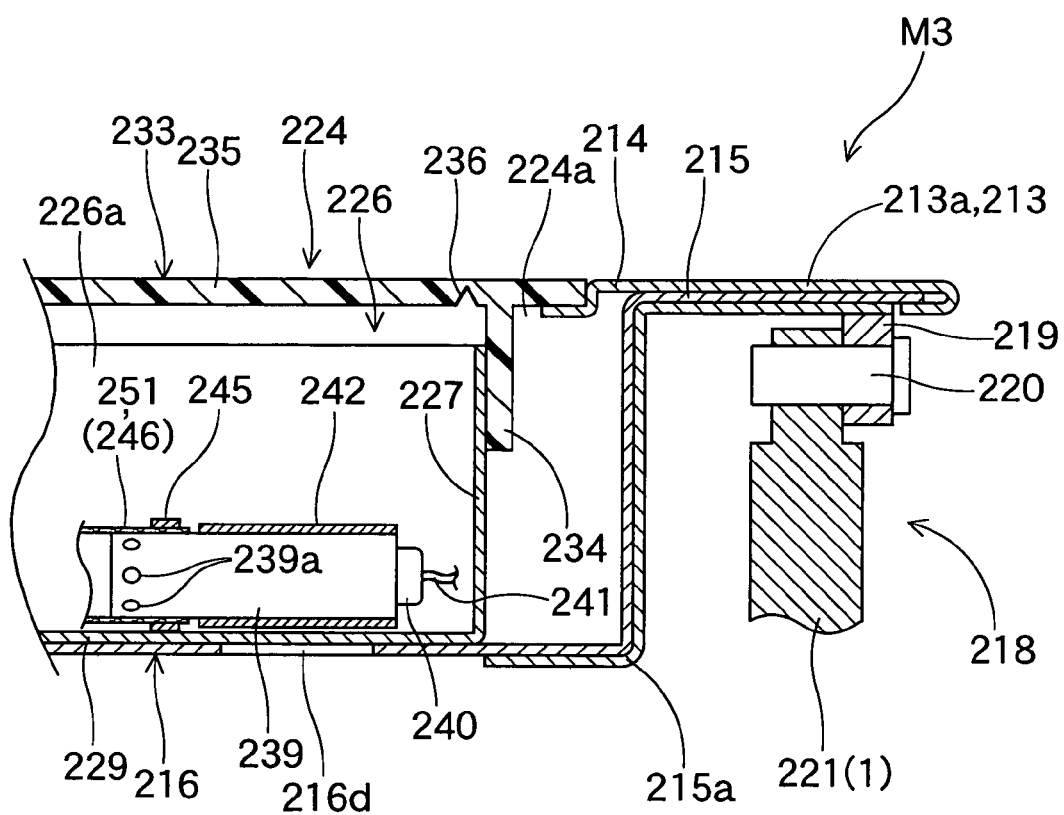
FIG. 15 is a schematic cross-sectional view showing a portion near the lateral ends of a case in the pedestrian airbag system according to the third embodiment.
Figure 16:
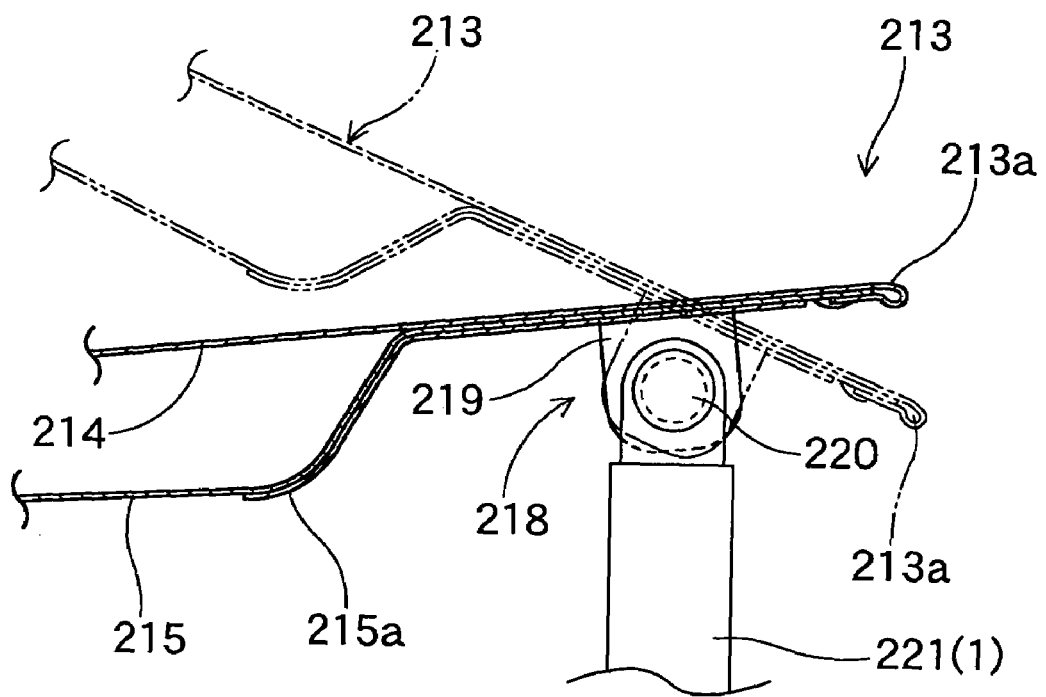
FIG. 16 is a schematic cross-sectional view showing the hinge devices in the pedestrian airbag system according to the third embodiment taken along the fore-and-aft direction of the vehicle.

The respective hinge devices 218 disposed near the rear end 213a at lateral ends of the hood panel 213 each include a pin support member 219, a body side member 221, and a pin 220 as shown in FIGS. 15, 16. The pin support member 219 projects from the lower surface side of the rear end 213a of the hood panel 213. The body side member 221 is disposed on the body 1 side. The pin 220 is formed into a rod shape and rotatably connects the pin support member 219 and the body side member 221.

The airbag module 224 is disposed in an opening 214a formed by cutting out the outer panel 214 as shown in FIGS. 12 to 15. More specifically, the airbag module 224 is accommodated in the rear portion 216a of the reinforcing rib 216 of the inner panel 215. The airbag module 224 includes an airbag 246, inflators 239, a case 226, and an airbag cover 233. The inflators 239 are adapted to supply inflation gas to the airbag 246. The case 226 accommodates the folded airbag 246 and the inflators 239. The airbag cover 233 covers the area above the case 226.

The case 226 is formed of sheet metal, and is disposed substantially over the entire lateral length of the hood panel 213 so that the left and right ends are disposed near the hinge devices 218, 218. The case 226 is curved so as to project at the lateral center toward the front along the rear portion 216a of the reinforcing rib 216 when viewed from above. In this embodiment, the case 226 is formed substantially into a box shape having a side wall portion 227 which is substantially a square tube, and a bottom wall portion 229 for closing the lower end of the side wall portion 227. The side wall portion 227 is opened on top and is aligned substantially in the vertical direction.

The outer surfaces of wall portions 227a, 227b opposing each other at the front and rear are formed with a plurality of engaging claws 228 so as to project therefrom. The engaging claws 228 are members for attaching the airbag cover 233 to the case 226. A plurality of the engaging claws 228 are provided respectively on the front and rear wall portions 227a, 227b. The respective engaging claws 228 are formed by bending their distal ends 228a downward, so that the distal ends 228a can be engaged with the peripheral edges of the engaging holes 234a formed on a side wall portion 234, described later, of the airbag cover 233. In this embodiment, the respective engaging claws 228 are formed by making cuts of a predetermined shape on the front and rear wall portions 227a, 227b, and lifting the cut portions away from the remaining front and rear wall portions 227a, 227b so as to still be integral with the front and rear wall portions 227a, 227b (see FIGS. 13, 14).

The bottom wall portion 229 is disposed on the lower side of the folded airbag 246. The bottom wall portion 229 is formed with a plurality of insertion holes 229a. The insertion holes 229a are disposed so as to be capable of inserting bolts 230 for mounting the mounting strips 254, described later, of the airbag 246 to the case 226 or bolts 243 for mounting the inflators 239 to the case 226 (see FIGS. 13, 14). The case 226 is formed with insertion holes, not shown, for inserting lead wires 241, described later, of the inflators 239 at predetermined positions.

Figure 14:
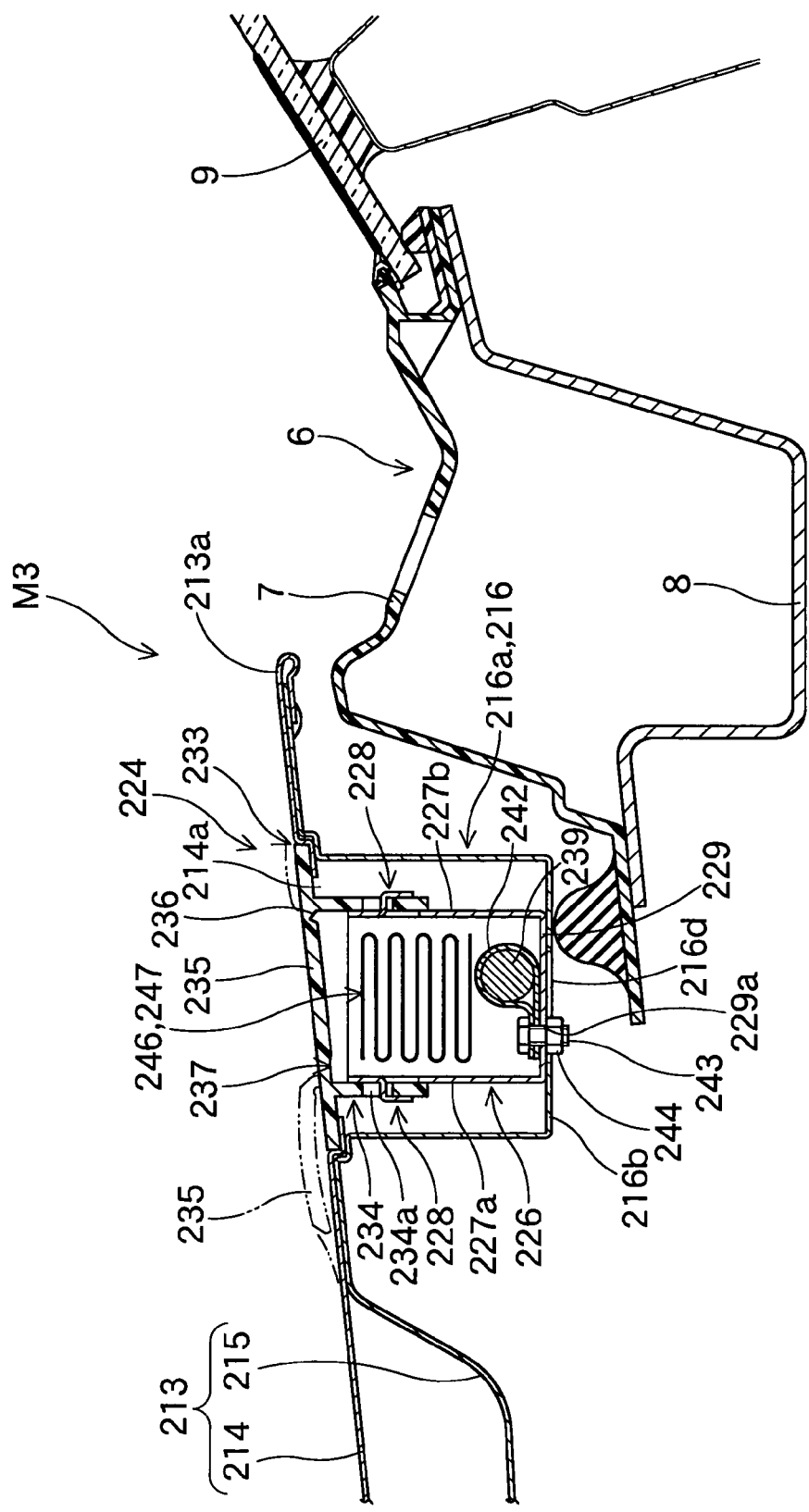
FIG. 14 is a schematic vertical cross-sectional view of the pedestrian airbag system according to the third embodiment taken along the fore-and-aft direction of the vehicle, which corresponds to XIV-XIV in FIG. 12.

In this embodiment, the case 226 is fixedly mounted to the rear portion 216a of the reinforcing rib 216 (inner panel 215) using the bolts 230 and the nuts 231 for mounting the mounting strips 254 of the airbag 246 to the case 226. In other words, in the airbag module 224 of this embodiment, the mounting bolts 230 projecting from the case 226 are inserted into insertion holes 216c formed on a bottom wall portion 216b of the rear portion 216a. Subsequently, the nuts 231 are tightened to the bolts 230 projecting from the bottom wall portion 216b. Consequently, the airbag module 224 is fixedly mounted to the reinforcing rib 216 of the inner panel 215 with the lower side of the bottom wall portion 229 of the case 226 supported by the bottom wall portion 216b of the rear portion 216a. The bottom wall portion 216b of the rear portion 216a is formed with openings 216d at predetermined positions as shown in FIGS. 14, 15. The openings 216d are for inserting the bolts 243 and the nuts 244 for fixing the inflators 239 to the bottom wall portion 229 of the case 226.

The airbag cover 233 is formed of synthetic resin such as olefin thermoplastic elastomer. The airbag cover 233 is disposed so as to cover the case opening 226a on the area above the case 226. In this embodiment, the airbag cover 233 is disposed so as to close the opening 214a formed on the outer panel 214 of the hood panel 213. The airbag cover 233 is disposed so that the upper surface thereof is substantially flush with the surface of the surrounding outer panel 214. The airbag cover 233 includes a case-surrounding wall portion 234 and a flap portion 235 for covering a case opening 226a. The case-surrounding wall portion 234 is formed substantially into a cylindrical shape, and is projected downward so as to be disposed on the outer periphery of the side wall portion 227 of the case 226. The case-surrounding wall portion 234 is formed with a plurality of engaging holes 234a for engaging the engaging claws 228. The airbag cover 233 is attached to the case 226 by engaging the engaging claws 228 disposed on the case 226 with the peripheral edges of the engaging holes 234a.

The flap portion 235 is, in this embodiment, curved so as to project at the lateral center toward the front along with the opening 226a of the case 226 when viewed from above, as shown in FIG. 12. The breakaway portion 236, which can be broken when the airbag 246 projects, is disposed along the left edge side, the right edge side, and the rear edge side of the flap portion 235. Disposed on the front edge of the flap portion 235 is hinge portion 237 which serve as a center of rotation when opening (see FIGS. 13 to 15).

In this embodiment, the inflators 239 are disposed at two positions which correspond to the left and right ends of the case 226 as shown in FIG. 12. The respective inflators 239 are formed substantially into long cylinders as shown in FIGS. 14, 15, and their axes are disposed substantially along the lateral direction at positions near the hinge devices 218. The ends of the respective inflators 239 which are inside the case are provided with a plurality of gas injection ports 239a. The other ends of the inflators 239 are provided with connectors 240 to which the lead wires 241 are connected. The inflators 239 are restrained at their peripheries by brackets 242 formed of sheet metal. The inflators 239 are fixedly mounted to the case 226 by the brackets 242 fixed to the case 226 using the bolts 243. Inlet ports 251, described later, of the airbag 246 are connected to the ends of the inflators 239 having the gas injection ports 239a. In this embodiment, the inlet ports 251 are connected to the inflators 239 using clamps 245.

Figure 17:
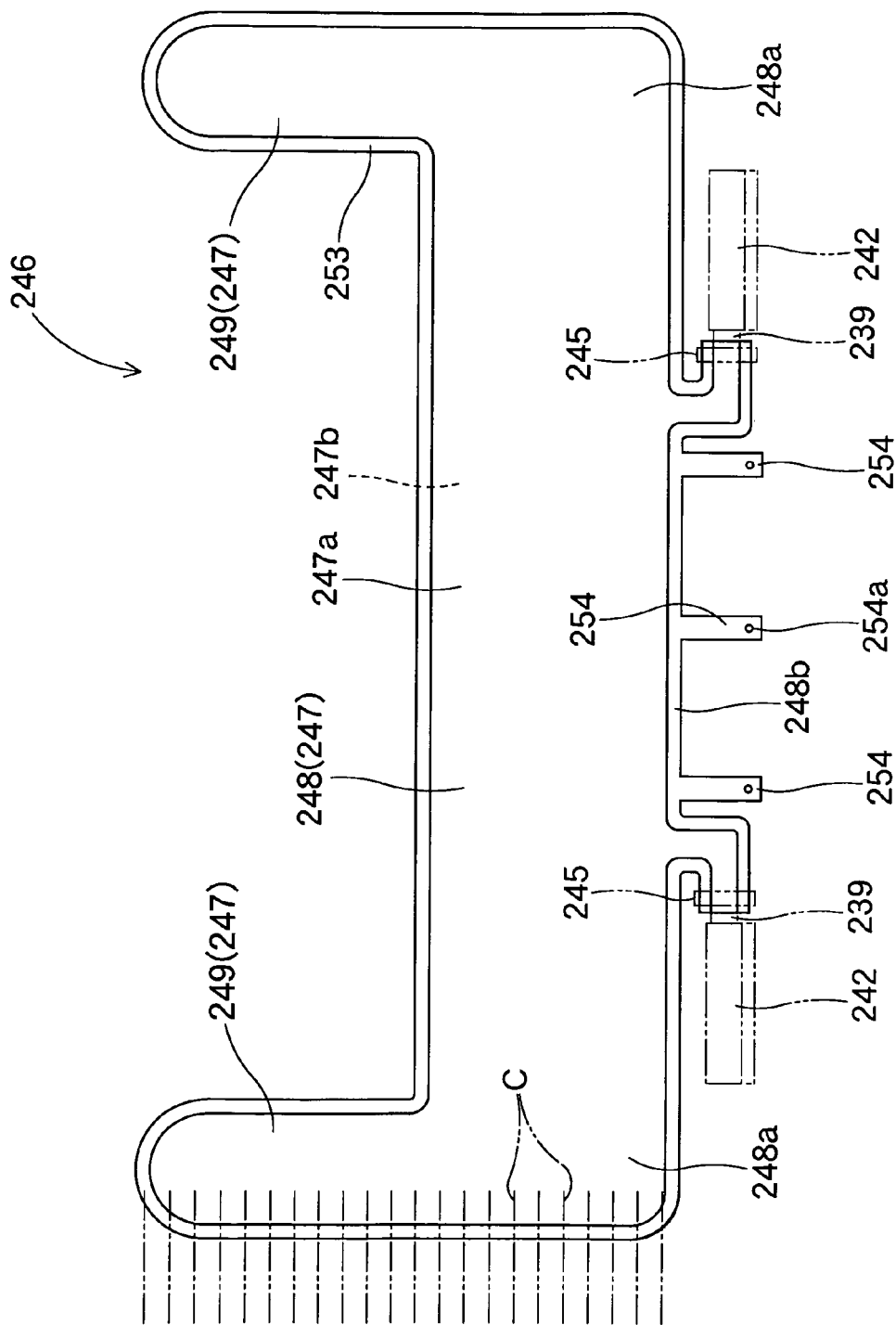
FIG. 17 is a plan view of the airbag used for the pedestrian airbag system according to the third embodiment.

The airbag 246 includes an inflating section 247 and a peripheral portion 253 disposed around the inflated section 247, as shown in FIG. 17. The inflated section 237 is configured so as to be inflated by being supplied with inflation gas. The peripheral portion 253 is configured not to be supplied with inflation gas. The inflated section 247 is capable of being inflated with inflation gas supplied therein so as to separate a front wall portion 247a and a back wall portion 247b apart from each other. The front wall portion 247a and the back wall portion 247b have an identical shape in plan view. The airbag 246 is, in this embodiment, a flat airbag type which can be deployed flatly with the wall portions 247a, 247b overlapping each other. More specifically, the airbag 246 are manufactured by hollow-webbing using polyester yarn, polyamide yarn, and so on.

Figure 18:
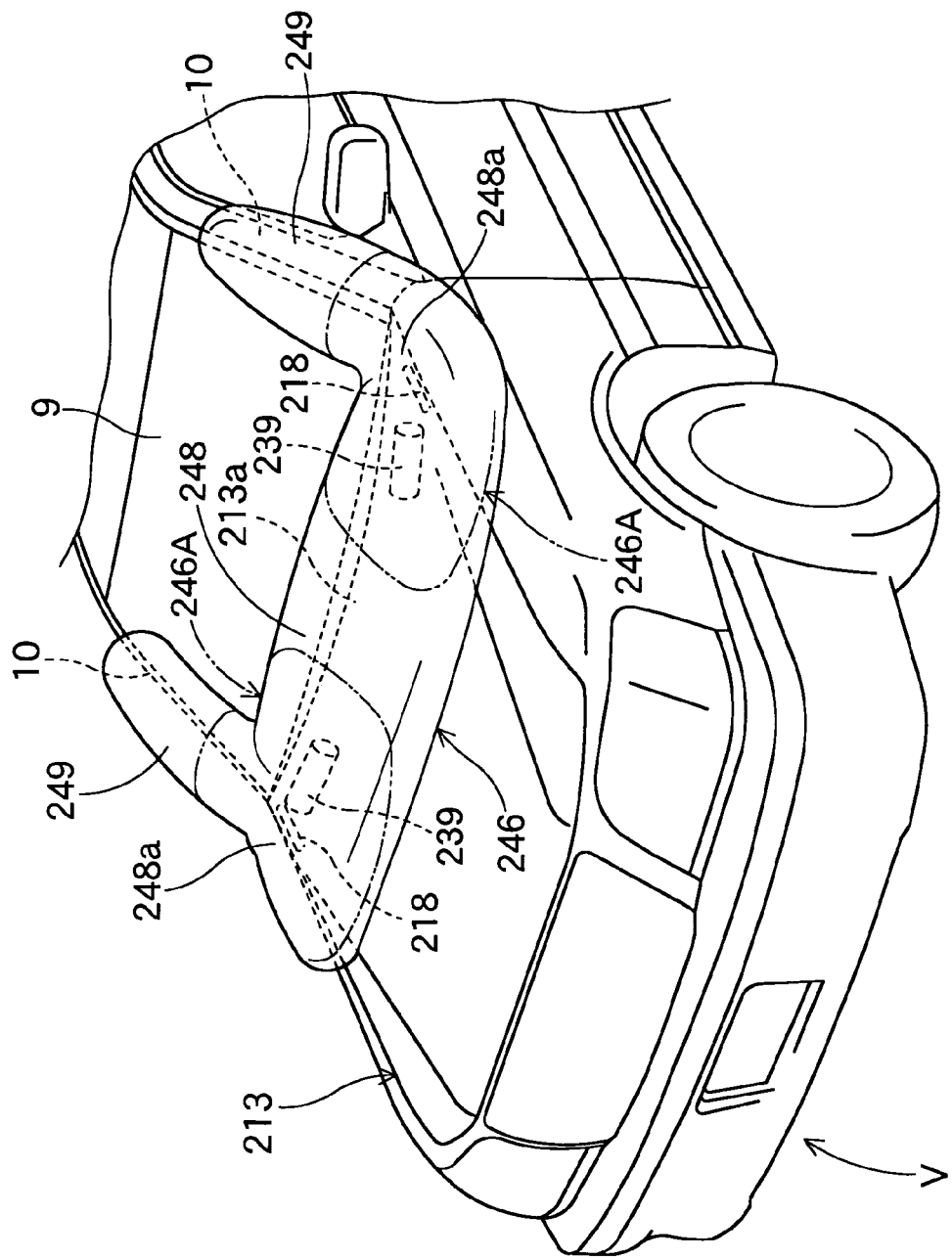
FIG. 18 is a perspective view of the vehicle in a state in which inflation of the airbag is completed in the pedestrian airbag system according to the third embodiment.

The inflated section 247 has a substantially U-shape which is wide in the lateral direction when viewed from the front when it is completely inflated as shown by a chain double-dashed line in FIG. 12 and in FIG. 18, and is provided with the lateral inflating section 248 and the vertical inflating sections 249, 249. The lateral inflating section 248 is a portion disposed in the lateral direction. The vertical inflating sections 249, 249 are portions extending rearward from left and right ends of the lateral inflating section 248 so as to cover the front of the front pillars 10. The lateral inflating section 248 is configured so as to cover substantially the entire lateral length from the upper surface of the hood panel 213 near the rear end 213a to the lower portion of the front wind shield 9 when inflation of the airbag 246 is completed. Between the hood panel 213 and the front wind shield 9, there is provided the cowl 6. The cowl 6 includes the cowl panel 8 and the cowl louver 7 disposed upwardly of the cowl panel 8. Thus, the lateral inflating section 248 of the airbag 246 is configured to be able to cover substantially the entire rear portion 213a of the hood panel 213 and the cowl 6 when inflation is completed. The lateral inflating section 248 is configured to be able to cover the area above the case 226, that is, the area above the respective inflators 239, 239, when inflation is completed as a matter of course. The lateral inflating section 248 is configured to be able to cover the area above the respective hinge devices 218, 218 at left and right end portions 248a, 248a when the inflation is completed.

The lateral inflating section 248 is formed with inlet ports 251, 251 at a front edge 248b thereof (lower edge side when inflation is completed on the vehicle) near the left and right ends. The respective inlet ports 251, 251 extend toward the front, and are bent so as to be away from each other. The inlet ports 251 are used for allowing inflation gas from the inflators 239 to flow into the inflating section 247 of the airbag 246. The respective inlet ports 251 are fitted on the inflators 239 as shown by a chain double-dashed line in FIGS. 15, 17, and are connected to the inflators 239 using the clamps 245.

Figure 13:
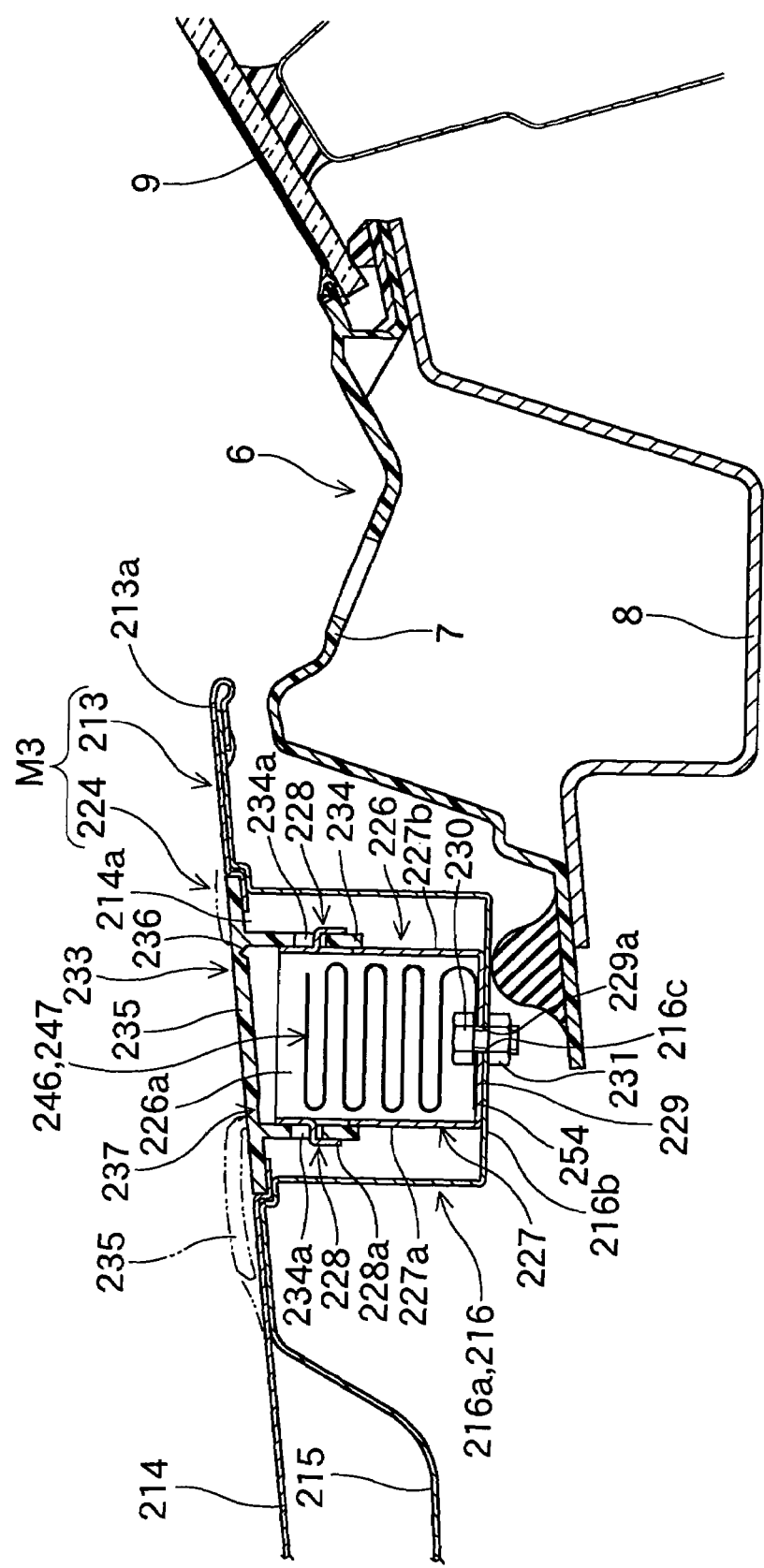
FIG. 13 is a schematic vertical cross-sectional view of the pedestrian airbag system according to the third embodiment taken along the fore-and-aft direction of the vehicle, which corresponds to XIII-XIII in FIG. 12.

The mounting strips 254 extending in a plate shape are formed at three positions at the periphery portion 253 on the front edge 248b side of the lateral inflating section 248. The mounting strips 254 are members for fixing the airbag 246 to the case 226. The mounting strips 254 are provided with mounting holes 254a for the inserting bolts 230. The mounting strips 254 are to be mounted to the bottom wall portion 229 of the case 226 using the bolts 230 as shown in FIG. 13.

The airbag system M3 according to the third embodiment is mounted to the vehicle V as follows. The airbag 246 is folded first. More specifically, the front and back wall portions 247a, 247b are overlapped with each other and deployed into a flat state. Then, as shown by a chain double-dashed line in FIG. 17, it is folded along a folding line C such as mountain folds and valley folds, which extends in parallel with the front edge 248b of the lateral inflating section 248. More specifically, it is accordion-folded so as to bring the portion which is the rear edge when inflation is completed closer to the front edge 248b except for the inlet port 251 and the mounting strip 254. Then, the lateral ends of the accordion-folded airbag 246 are folded inward toward each other so as to be capable of being accommodated in the case 226. Then, predetermined positions around the folded airbag 246 are wrapped by a breakable wrapping material, not shown, to complete folding of the airbag 246. Subsequently, the respective inflators 239 retained by the brackets 242 are inserted into the inlet ports 251 with the ends with gas injection ports 239a inserted first. Then, using the clamps 245, the inflators 239 are connected to the inlet ports 251 so that the inflators 239 are attached to the airbag 246. The bolts 230 are inserted into the mounting holes 254a of the respective mounting strips 254.

Subsequently, the airbag 246 is accommodated in the case 246 from the opening 226a together with the inflators 239 in such a manner that the bolts 230, 243 are projected from the insertion holes 229a. Nuts 244 are tightened to the bolts 243 projecting from the bottom wall portion 229 of the case 226, so that the inflators 239 are fixedly mounted to the case 226. Then, the airbag cover 233 is attached to the case 226 with the respective engaging claws 228 engaged with the peripheral edge of the engaging holes 234a to form the airbag module 224.

Subsequently, the airbag module 224 is accomodated to the rear portion 216a of the reinforcing rib 216. At this time, the bolts 230 are projected from the insertion holes 216c formed on the bottom wall portion 216b. By tightening nuts 231 with the bolts 230 projecting from the bottom wall portion 216b, the airbag module 224 can be attached to the hood panel 213, and hence the airbag system M3 can be assembled. Subsequently, the hood panel 213 is fixed to the body 1 side of the vehicle V using the hinge devices 218, 218. Simultaneously, the connectors 240, to which the lead wires 241 extending from the body 1 are connected, are inserted into insertion holes, not shown, of the case 226, and are connected to the inflators 239. Subsequently, the airbag system M3 can be mounted to the vehicle V.

In the airbag system M3 according to the third embodiment, in the state of being mounted on the vehicle, when the operation signal is supplied to the inflators 239 of the airbag module 224, inflation gas is injected from the gas injection ports 239a of the inflators 239. Accordingly, the airbag 246 is inflated by allowing inflation gas from the inflators 239 to flow therein. Subsequently, the flap portion 235 of the airbag cover 233 is pushed by the airbag 246, and opens toward the front of the vehicle V by breaking the breakaway portion 236. The airbag 246 projects upward from the opening 226a of the case 226 formed when the flap portion 235 opens, and completes inflation as shown by a chain double-dashed line in FIG. 12 and in FIG. 18.

In the airbag system M3 according to the third embodiment, the airbag module 224 disposed near the rear end 213a of the hood panel 213 is accommodated in the rear portion 216a of the reinforcing rib 216 of the inner panel 215. Therefore, in the initial stage of inflation of the airbag 246, the reaction force generated when the airbag 246 projects upward can be received by the rigid reinforcing rib 216 of the inner panel 215. Consequently, the direction in which the airbag projects 246 can be stabilized.

Therefore, in the airbag system M3 according to the third embodiment, the airbag 246 can be accommodated so that the direction of projection is stabilized.

In the airbag system M3 according to the third embodiment, the airbag module 224 is accommodated in the reinforcing rib disposed normally on the inner panel which constitutes the vehicle hood panel. In other words, it is not necessary to provide a space for accommodating the airbag module 224 on the lower side of the hood panel 213. Therefore, the structure of the third embodiment can be applied to the vehicle which is not originally provided with an airbag module without significant modification of the design.

In the airbag system M3 according to the third embodiment, the respective inflators 239 of the airbag module 224 are respectively disposed near the hinge devices 218 for connecting the hood panel 213 to the body 1 side of the vehicle V. The hood panel 213 is connected to the body 1 using the hinge devices 218 so as to be capable of opening and closing to the front of the vehicle. Therefore, the peripheries of the hinge devices 218 are provided with a reinforcing panel 215a so as to provide higher rigidity than other portions of the hood panel 213. Therefore, in the airbag system M3 according to the third embodiment, in the initial stage of inflation of the airbag 246, the reaction force exerted downward by the inflator 239 when the airbag 246 projects upward can be received by the periphery portions around the hinge devices 218. Consequently, the inflators 239 can be reliably supported by the periphery portions around the hinge devices 218. There may be a case in which the rigidity of the peripheral portions of the hinge devices 218 is not sufficient for supporting the inflators 239, and hence it is necessary to increase the rigidity of these portions. However, even when such a necessity arises, the peripheral portions of the hinge devices 218 have higher rigidity than other portions of the hood panel 213. Therefore, the amount of reinforcing member needed for increasing rigidity is less than that of the pedestrian airbag system having a structure in which the airbag module is mounted substantially at the center of the hood panel in the longitudinal direction as in the related art. Consequently, increase in weight of the hood panel 213 can be restrained.

In the airbag system M3 according to the third embodiment, the heavy inflators 239 are disposed near the hinge devices 218 at the rear end 213a side of the hood panel 213. Therefore, the airbag module 224 can be prevented from significantly vibrating during travel of the vehicle or the like in comparison with the pedestrian airbag system having a structure in which the airbag module is mounted substantially at the center of the hood panel in the longitudinal direction as in the related art.

Therefore, in the pedestrian airbag system M3 according to the third embodiment, the case 226 (the airbag module 224) can be supported stably while restraining increase in weight.

In the airbag system M3 according to the third embodiment, there are portions of the airbag 246 for covering the area above the inflators 239 and for covering the area above the hinge devices 218 when inflation is completed. In other words, in the airbag system M3 according to the third embodiment, the single airbag 246 which is completely inflated can cover the area above the inflators 239 and the area above the hinge devices 218. Therefore, even when the pedestrian collides with the position of the hood panel 213 near the inflators 239 or the hinge devices 218, the pedestrian can be prevented from colliding with the rigid inflators 239 or the hinge devices 218 by the completely inflated airbag 246. Consequently, the pedestrian can be adequately protected.

In the airbag module 224 of the airbag system M3 according to the third embodiment, two inflators 239 are employed and are disposed near the hinge devices 218, respectively. As a matter of course, a structure in which a single inflator is provided near one of the hinge devices can be employed as the airbag module.

In the airbag module 224 of the airbag system M3 according to the third embodiment, the airbag 246 has the lateral inflating section 248 and the vertical inflating sections 249, 249. However, the structure of the airbag is not limited thereto, as a matter of course. For example, the structure having no vertical inflating sections may be employed as the airbag. Alternatively, two airbags each covering only the area above one of the inflators 239 and the area above one of the hinge devices 218 when inflation is completed may be provided as an airbag 246A as shown by a chain double-dashed line in FIG. 18.

Figure 19:
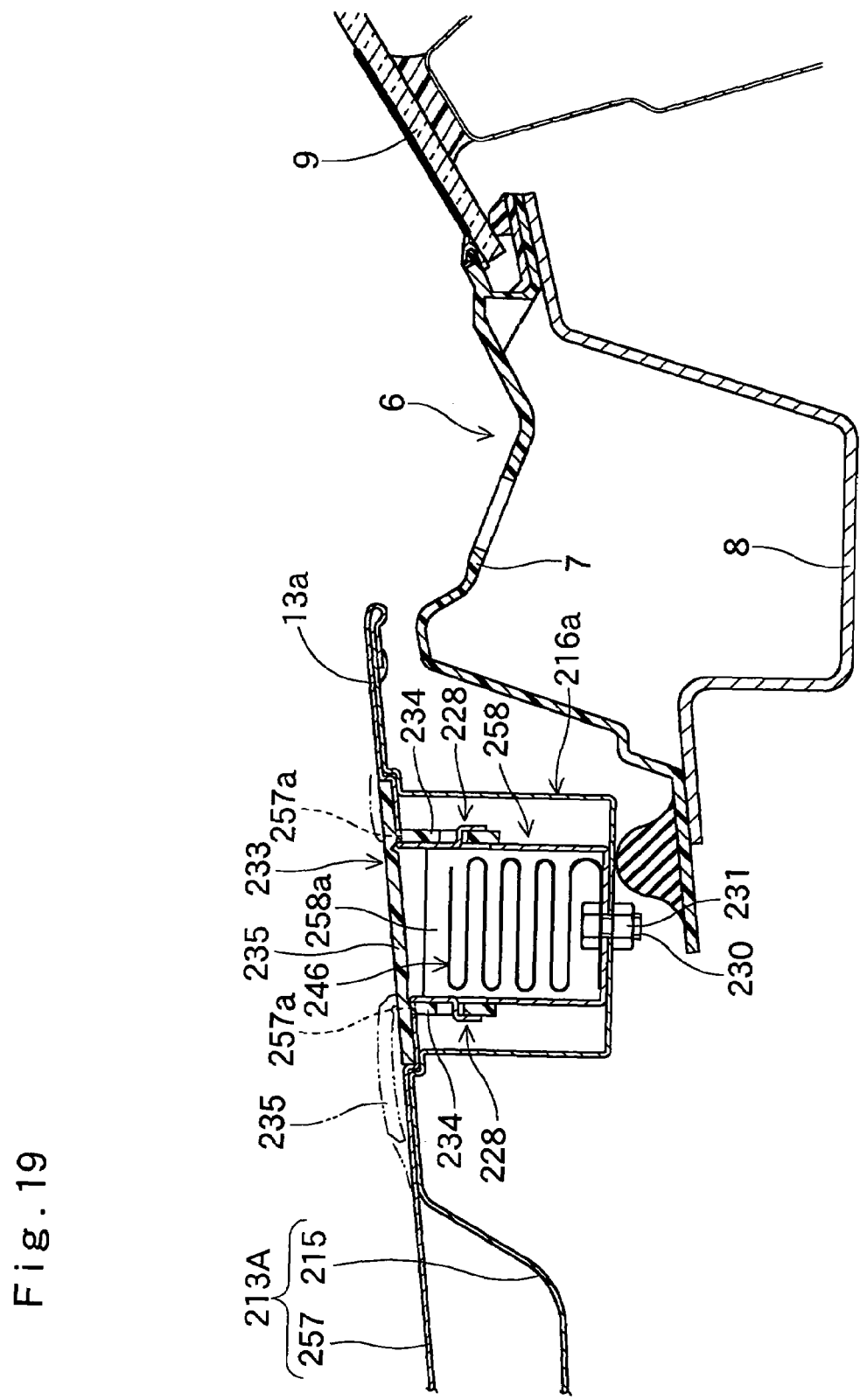
FIG. 19 shows a modification of the pedestrian airbag system according to the third embodiment and is a schematic cross-sectional view taken along the fore-and-aft direction of the vehicle.
Figure 20:
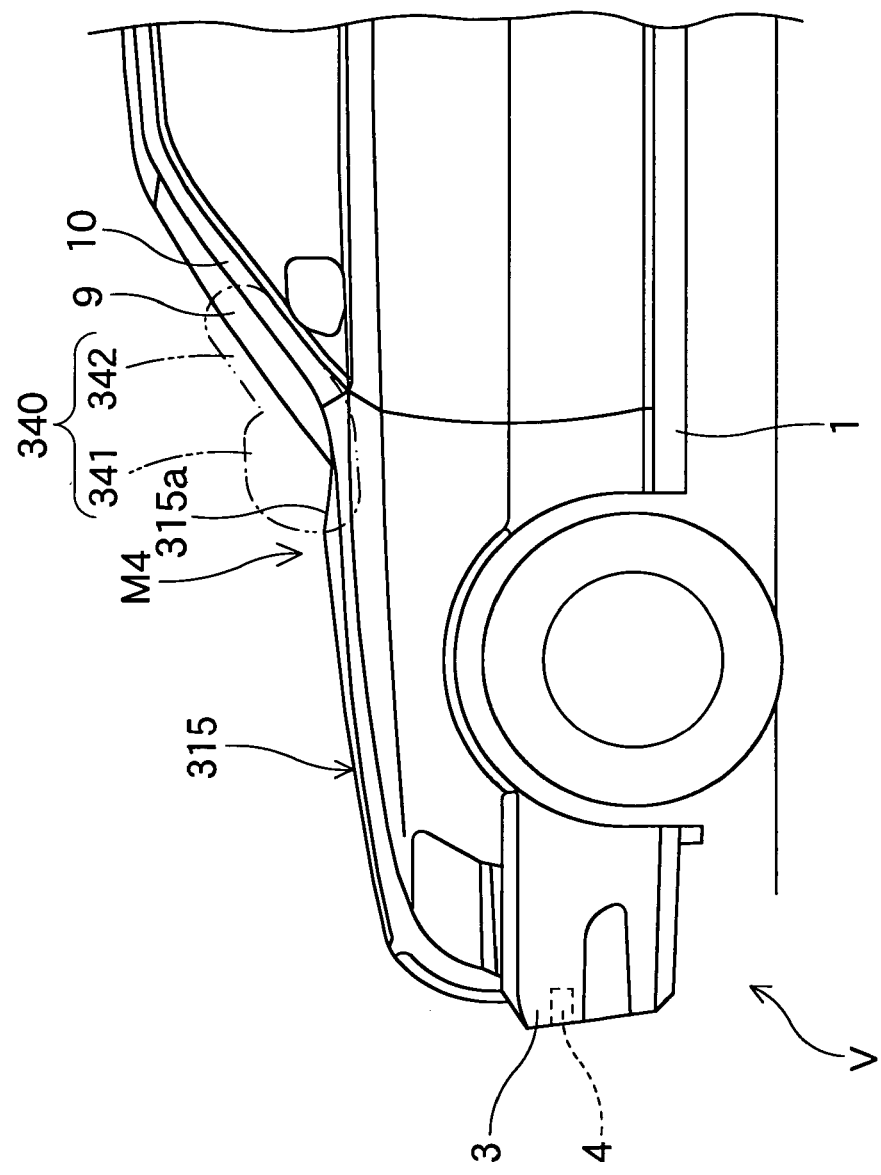
FIG. 20 is a side view of the vehicle on which a pedestrian airbag system according to a fourth embodiment is mounted.

Furthermore, as the airbag system, a hood panel 213A having a structure as shown in FIG. 19 can be employed. In the hood panel 213A, a case 258 for accommodating the folded airbag 246 and the inflators 239 is formed by depressing the rear end portion of the outer panel 257 of the hood panel 213A substantially into a box shape. In other words, in the hood panel 213A, the case 258 is formed integrally with the outer panel 257. The airbag system shown in FIG. 19 has the same structure as the aforementioned airbag system M3 except for the outer panel 257 and the case 258. Therefore, the identical members are represented by the same reference numerals and description will be omitted. When the case 258 is configured as described above, the outer panel 257 is formed by depressing the portion around the opening 258a so as to be capable of accommodating the airbag cover 233. In this way, the surface of the airbag cover 233 is disposed so as to cover the opening 258a of the case 258 substantially flush with the surface of the outer panel 257 around the case 258. At the portion of the outer panel 257 parallel to the peripheral edge of the opening 258a of the case 258 is formed with a plurality of insertion holes 257a therethrough. The insertion holes 257a enable insertion of the side wall portions 234 of the airbag cover 233. In the hood panel 213A of such structure, it is not necessary to separately provide a case for accommodating the airbag 246 and the inflator 239 using the outer panel 257, and hence the number of parts of the airbag system can be reduced.

In the third embodiment, the airbag module including the cases 221, 245 is exemplified. However, the structure of the airbag module is not limited thereto. For example, a structure in which the case is not provided, and the airbag 246 and the inflators 239 are accommodated in the rear portion 216a of the reinforcing rib 216 of the inner panel 215 directly may also be applicable.

Subsequently, a pedestrian airbag system M4 according to a fourth embodiment which can achieve the third object of the invention will be described.

As shown in FIGS. 20 to 24, the pedestrian airbag system M4 according to the fourth embodiment includes a hood panel 315, an airbag 340, inflators 335, and a case 327. The airbag 340 is disposed on the lower side near the rear end of the hood panel 315. The inflator 335 has a structure supplying inflation gas to the airbag 340. The case 327 accommodates the folded airbag 340 and the inflator 335.

The hood panel 315 is disposed so as to cover the area above the engine room, not shown, of the vehicle V. The hood panel 315 is connected to the body 1 of the vehicle V at the rear of the lateral edges 315a using hinges, not shown, so as to be capable of opening and closing to the front. The hood panel 315 includes an outer panel 316 on the upper side and an inner panel 317 to be disposed facing the lower surface of the outer panel 316, both formed of aluminum (aluminum alloy). The rear edge 315a of the hood panel 315 is curved so as to project at the lateral center toward the front.

Figure 22:
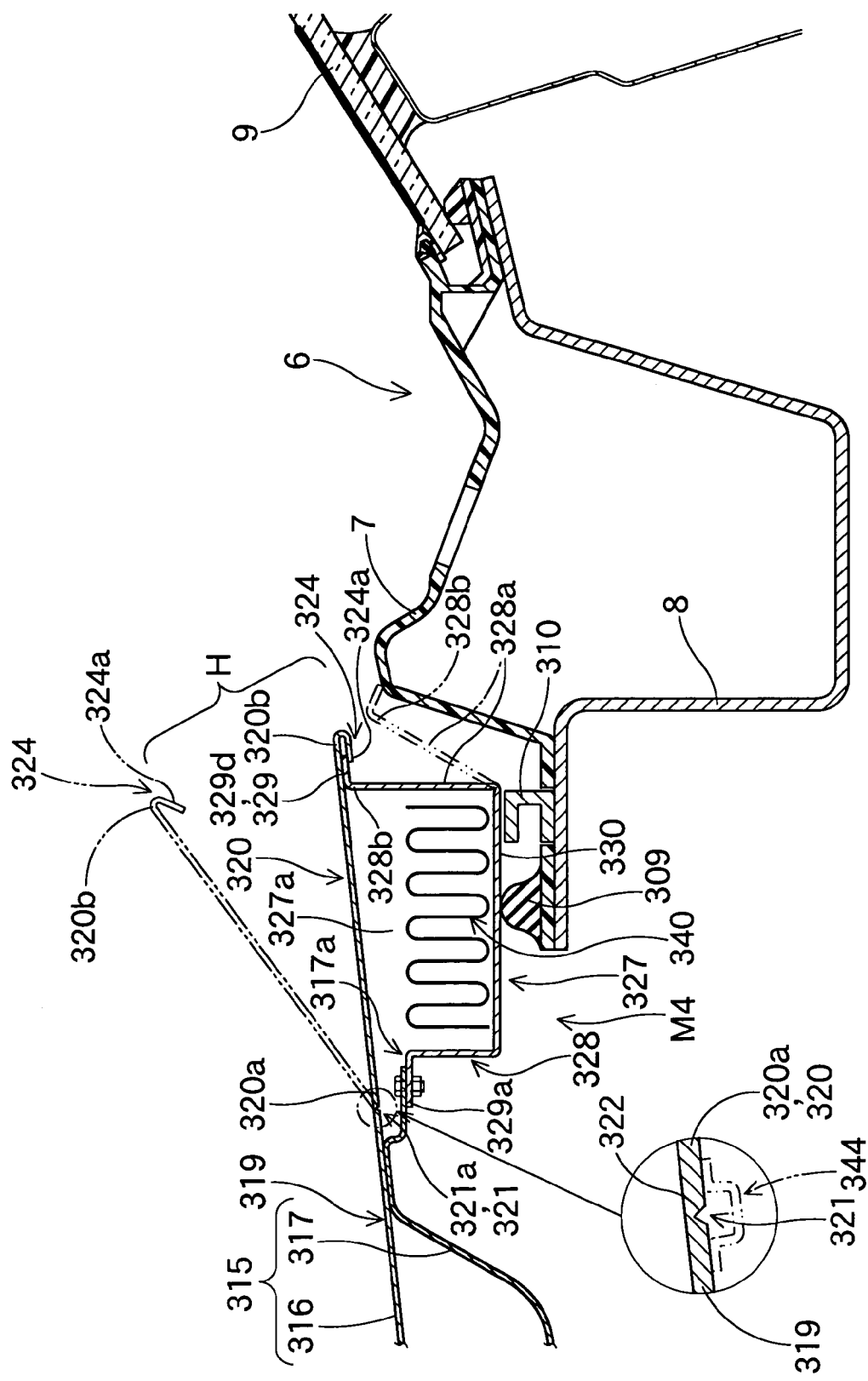
FIG. 22 is a schematic vertical cross-sectional view of the pedestrian airbag system according to the fourth embodiment taken along the fore-and-aft direction of the vehicle, which corresponds to XXII-XXII in FIG. 21.
Figure 23:
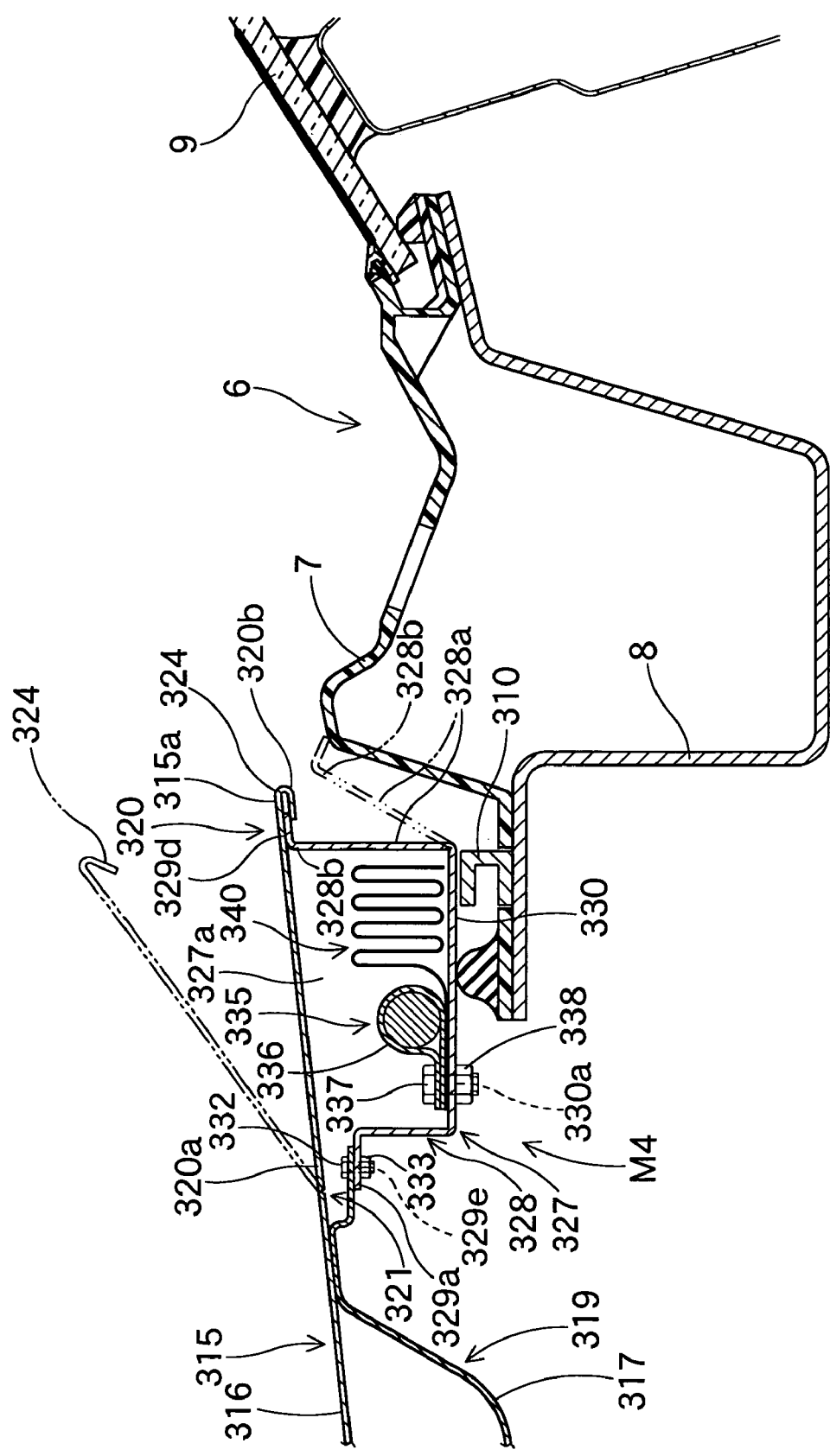
FIG. 23 is a schematic vertical cross sectional view of the pedestrian airbag system according to the fourth embodiment taken along the fore-and-aft direction of the vehicle, which corresponds to XXIII-XXIII in FIG. 21.
Figure 24:
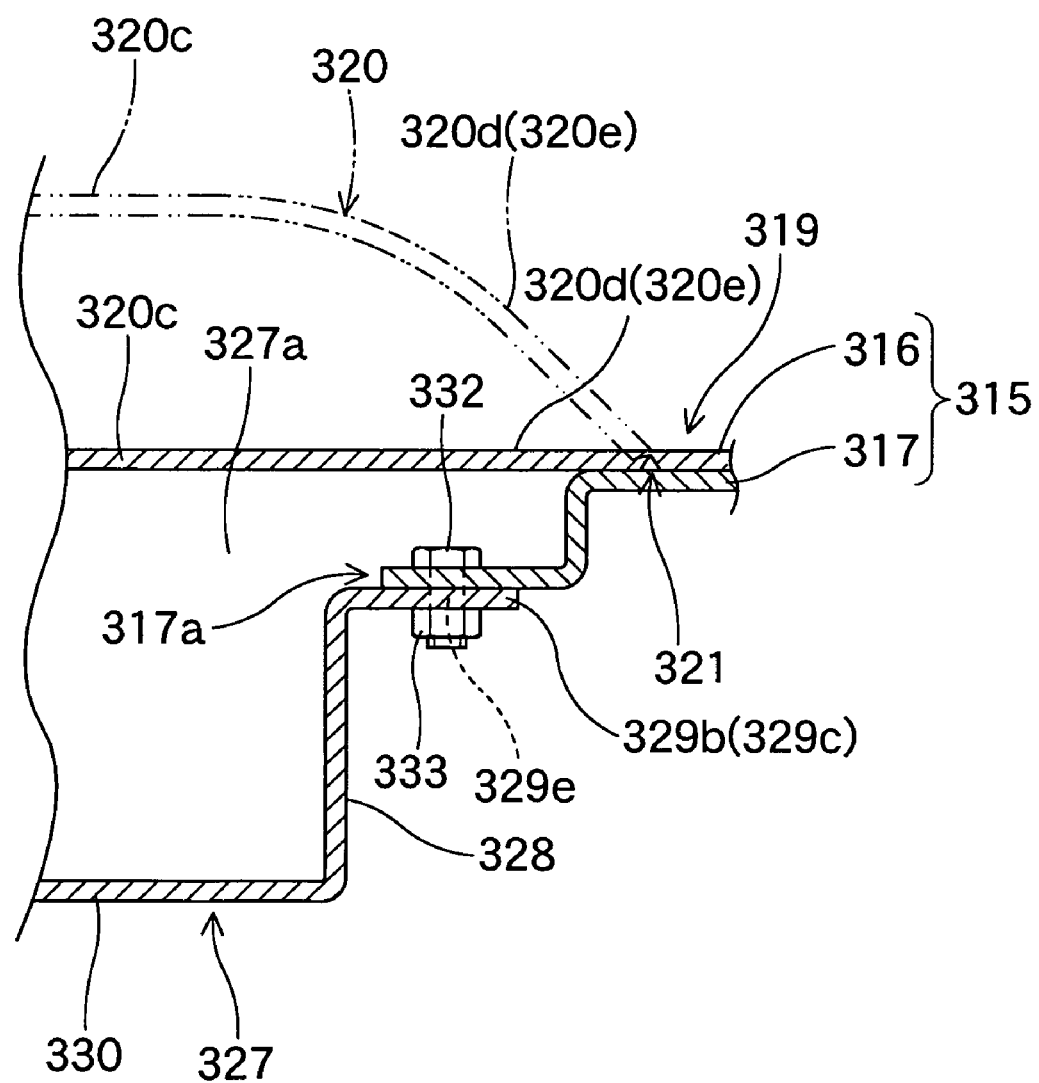
FIG. 24 is a schematic cross-sectional view of the pedestrian airbag system according to the fourth embodiment showing the portion near the lateral ends of the case and the cover portion.

The hood panel 315 includes a main panel 319 for covering the area above the engine room and a cover portion 320 to be disposed at the position rearwardly of the main panel 319 (rear edge 315a of the hood panel 315). The cover portion 320 is formed integrally with the main panel 319, and covers the area above the case 327. In this embodiment, the cover portion 320 includes only the outer panel 316 as shown in FIGS. 22 to 24. The inner panel 317 has a structure in which the rear edge side is cut out so as to be capable of accommodating the case 327 at the cover portion 320.

Figure 21:
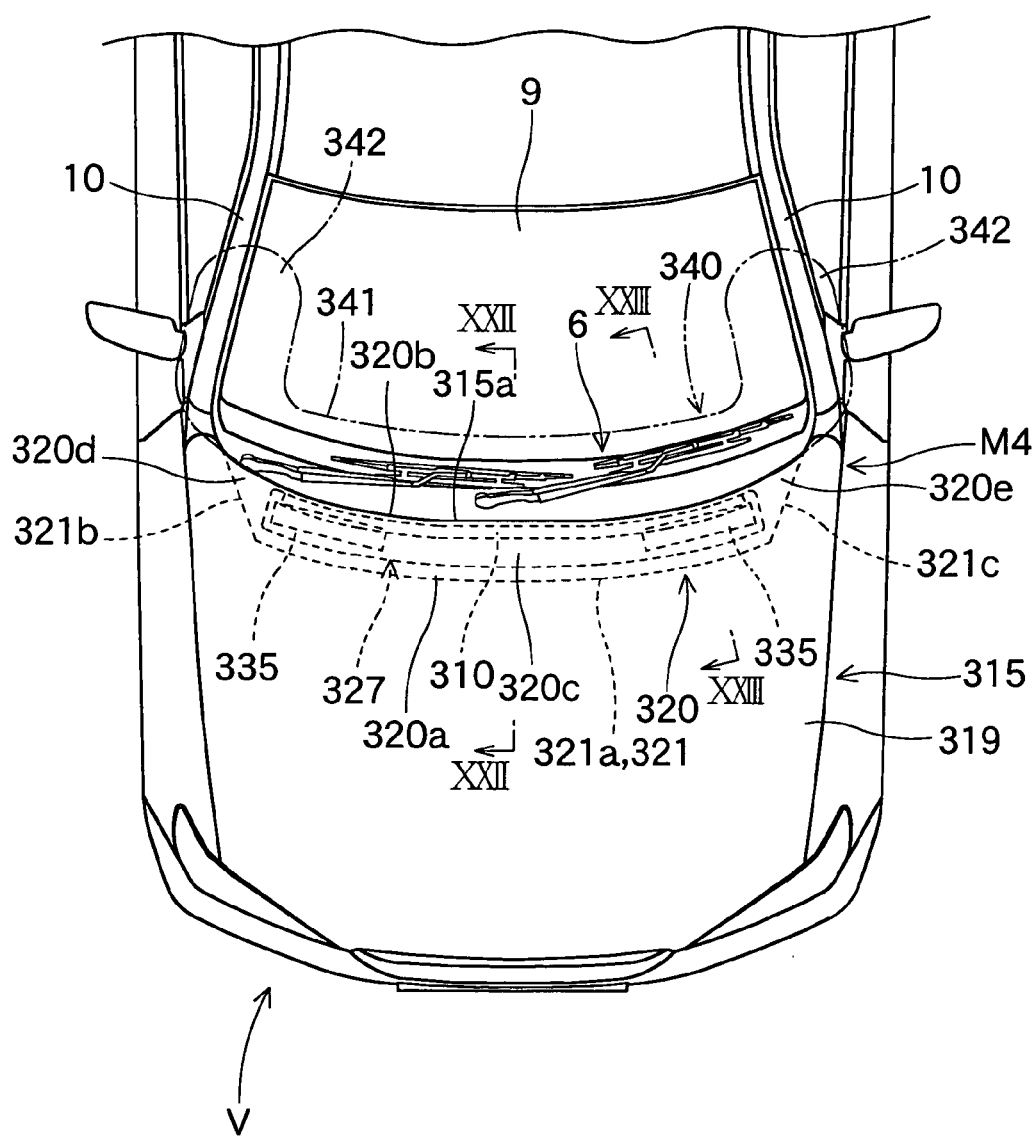
FIG. 21 is a plan view of a vehicle on which the pedestrian airbag system according to the fourth embodiment is mounted.

The cover portion 320 is disposed so as to be capable of covering the opening 327a of the case 327. In this embodiment, the cover portion 320 is disposed substantially over the entire lateral area of the hood panel 315. Hinge portion 321 is disposed at the front edge 320a side of the cover portion 320. The hinge portion 321 comprises a continuously or discontinuously provided recess groove 322 made by cutting of the rear surface side of the outer panel 316. The hinge portion 321 is adapted to be opened upward on the rear edge 320b side by bending and deforming the peripheral portion of the recess groove 322 when the airbag 340 is deployed and inflated. In this embodiment, the recess groove 322 is formed into a substantially V-shape in cross section, and is formed by press work, cutting work or the like. The hinge portion 321 (the recess groove 322) is disposed at a portion forwardly of the opening 327a of the case 327 as shown in FIGS. 21 to 23. The portion of the hinge portion 321 (the recess groove 322) in front of the case 327 (front side portion 321a) is provided so as to project at the lateral center toward the front along the case 327. At the lateral ends of the case 327, the hinge portion 321 (the recess groove 322) is formed into a tapered shape opening out to the rear, so as to connect the ends of the front side portion 321a and portions near the rear edge 315a of the hood panel 315 (the left and right portions 321b, 321c). In other words, in this embodiment, the cover portion 320 is formed substantially into a trapezoidal shape having the wider side toward the vehicle rear when viewed from above as shown in FIG. 21.

Engaging portions 324 are disposed on the rear edge side 320b of the cover portion 320. The engaging portions 324 are portions for fixing the cover portion 320 to the case 327. The engaging portions 324 each have the shape in which the distal end 324a side is bent toward the front. The engaging portions 324 are portions for engaging the cover portion 320 with a flange portion 329 (rear portion 329d) projecting rearward from an upper end 328b of a rear wall portion 328a, described later, of the case 327. The engaging portions 324 are disposed at a plurality of positions along the lateral direction. The engaging portions 324 are configured so that engaging state with the rear portion 329d can be released when the airbag 340 is inflated so as to push the cover portion 320 upward by allowing inflation gas to flow therein.

Then, in the cover portion 320 of this embodiment, the hinge portions 321b, 321c disposed on the front side of portions 320d, 320e which correspond to the lateral ends of the case 327 are disposed obliquely with respect to the rear edge 320b so that the lateral ends thereof are located to the rear. Accordingly, when the airbag 340 is deployed and inflated, the portions 320d, 320e are opened while expands portions near the hinge portions 321b, 321c but without breakage of the portion of the hinge portions 321b, 321c. In this way, the lateral end portions 320d, 320e of the cover portion 320 opened only slightly, as shown by a chain double-dashed line in FIG. 24. Therefore, the lateral ends 320d, 320e are hard to open widely upward when the airbag 340 is deployed and inflated. Accordingly, in this embodiment, the portion 320c located on the area above the case opening 327a of the cover portion 320 is significantly pressed upward by the airbag 340 which is supplied with inflation gas, the portion 320c can be prevented from opening up far from the rear edge 320b. This is because the left and right portions 320d, 320e serve as the stoppers.

The case 327 is formed of aluminum (aluminum alloy) and the lateral width of the case 327 is set to a value smaller than the lateral width of the hood panel 315 as shown in FIG. 21. The case 327 is curved so as to project at the lateral center toward the front when viewed from above along the rear edge 315a of the hood panel 315. In this embodiment, the case 327 is formed substantially into a box including a side wall portion 328 and a bottom wall portion 330 for closing the lower end of the side wall portion 328, as shown in FIGS. 22 to 24. The side wall portion 328 is formed into a substantially square tube which opens on top. The flange portion 329 is disposed at the upper side of the side wall portion 328 so as to project in the front, rear, left and right directions. The case 327 is fixed to the hood panel 315 in such a manner that a front side portion 329a, and the left and right side portions 329b, 329c of the flange portion 329 are fixed to the peripheral edge of the notched portion 317a of the inner panel 317 (peripheral edge of the cover portion 320) using the bolts 332 and nuts 333 (FIGS. 22 to 24).

Figure 25:
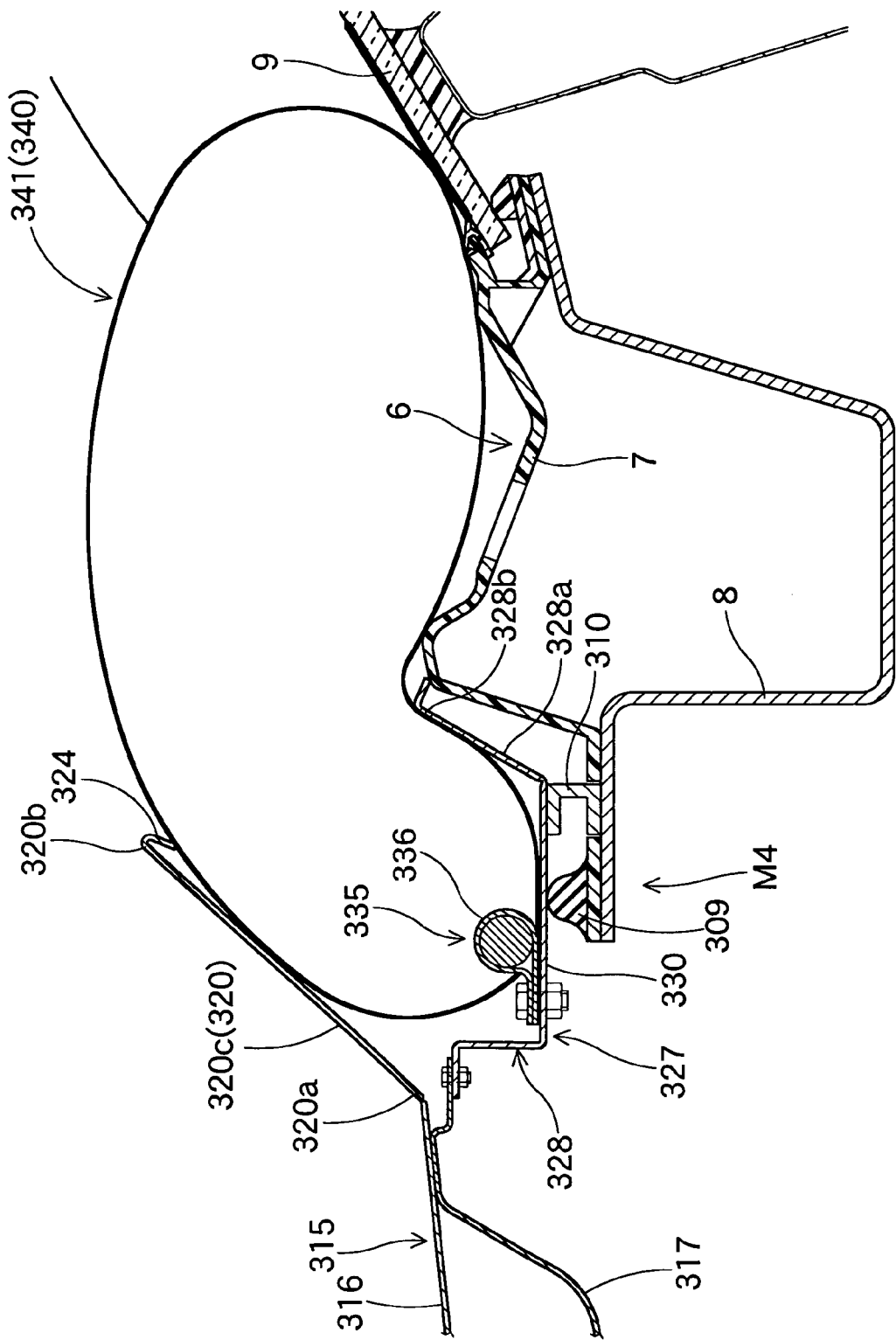
FIG. 25 is a schematic cross-sectional view of the pedestrian airbag system according to the fourth embodiment showing a state in which inflation of the airbag is completed.

Provided at the lower side of the rear edge of the bottom wall portion 330 of the case 327 is a stopper 310 extending from the cowl panel 8 as shown in FIGS. 22, 23. The stopper 310 is formed into a three sided square in cross section, and the lower side is fixed to the upper surface of the cowl panel 8. The stopper 310 has an elongated shape extending in the lateral direction as shown in FIG. 21. The stopper 310 is disposed in such a manner that the upper surface side is apart from the bottom wall portion 330 of the case 327 in the state of being mounted on the vehicle as shown in FIGS. 22, 23. The stopper 310 is disposed so that the upper surface thereof comes into abutment with the lower surface side of the bottom wall portion 330 when the airbag 340 is deployed and inflated, as shown in FIG. 25. In other words, the stopper 310 is configured so as to prevent the downward movement of the case 327 at the time of inflation of the airbag 340. A sealing member 309 is disposed between the cowl louver 7 and the bottom wall portion 330 of the case 327 (see FIGS. 22, 23).

The case 327 in this embodiment is formed of aluminum which can easily be plastically deformed. The case 327 in this embodiment has a structure in which the upper end 328b side of the rear wall portion 328a is not fixed to the hood panel 315 (inner panel 317). Therefore, when the airbag 340 is deployed and inflated, the rear wall portion 328a disposed to the rear of the airbag 340 is plastically deformed. More specifically, the rear wall portion 328a is plastically deformed so that the upper end 328b side of the rear wall portion 328a is moved rearward by being pushed by the airbag 340. In this embodiment, the rear wall portion 328a is plastically deformed about the portion near the connecting portion between the rear wall portion 328a and the bottom wall portion 330 as a center of rotation so that the upper end 328b side is directed rearward. The rear wall portion 328a is deformed with the upper end side at the lateral center moved rearward to the largest extent.

In this embodiment, the inflators 335 are disposed at two positions at the lateral ends of the case 327 as shown in FIG. 21. The inflators 335 each are formed substantially into a long cylinder shape having a gas injection port (not shown). The respective inflators 335 are connected to the airbag 340 so as to be capable of supplying inflation gas into the airbag 340. As shown in FIG. 23, the respective inflators 335 are retained by brackets 336 formed of sheet material. The respective inflators 335 are fixedly mounted to the case 327 by fixing these brackets 336 to the bottom wall portion 330 of the case 327 using the bolts 337 and nuts 338.

Figure 26:
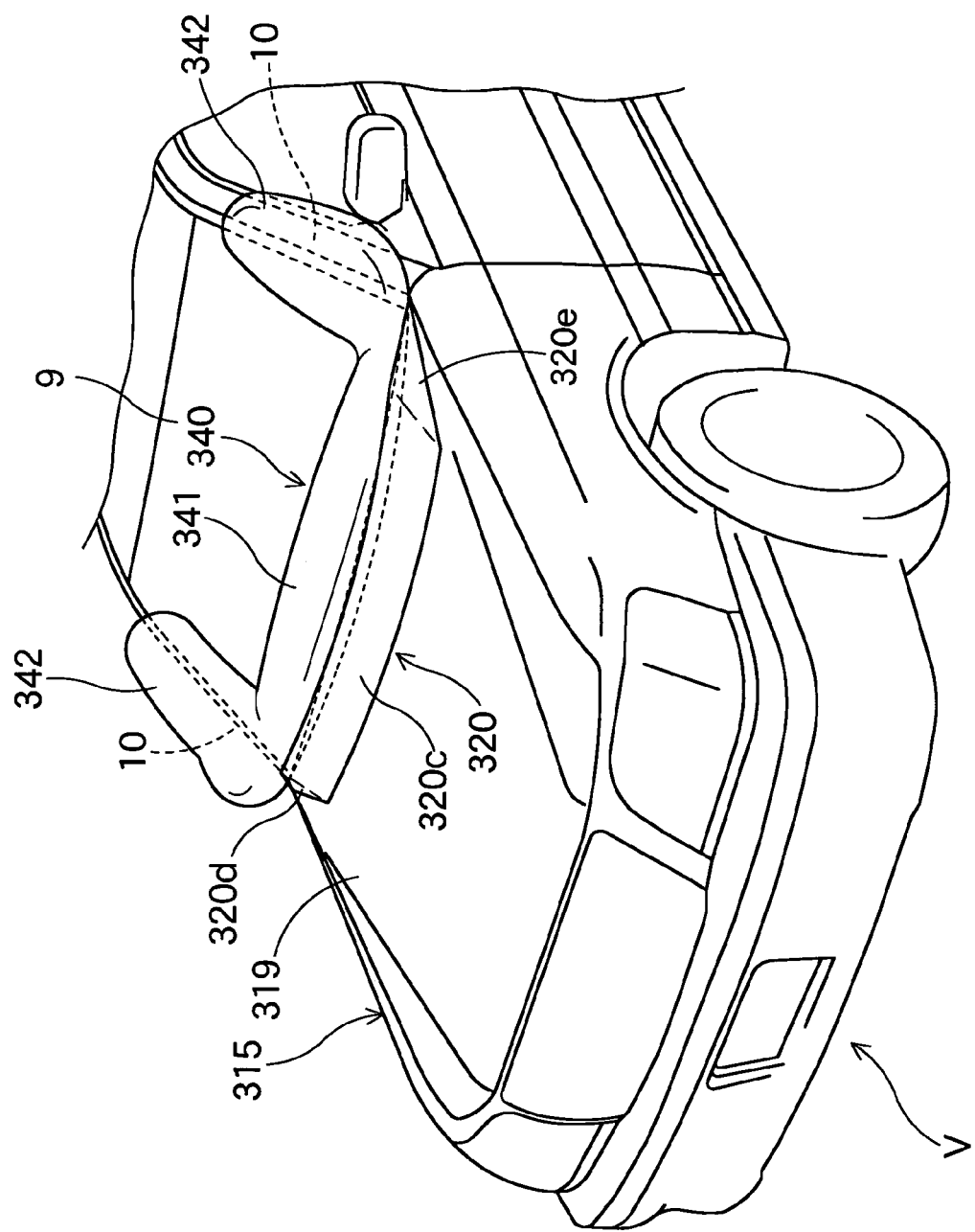
FIG. 26 is a perspective view of the pedestrian airbag system according to the fourth embodiment in a state in which inflation of the airbag is completed.

The airbag 340 has a structure which is deployed and inflated by allowing inflation gas injected from the inflators 335 to flow therein. In this embodiment, the airbag 340 is formed into a bag shape using textile fabric of polyester yarn or polyamide yarn or the like. The airbag 340 is, as shown in FIG. 23, fixedly mounted to the case 327 with the inflators 335 using bolts 337 for fixing the inflators 335. The airbag 340 has a substantially U-shape which is wide in the lateral direction when viewed from the front side when it is completely inflated as shown by a chain double-dashed line in FIG. 21 and in FIG. 26. The airbag 340 is provided with the lateral inflated section 341, and vertical inflated sections 342, 342. The lateral inflated section 341 is a portion to be disposed along the lateral direction. The vertical inflated sections 342, 342 are portions extending rearward from the lateral ends of the lateral inflated section 341. The vertical inflated sections 342, 342 are portions for covering the front side of the front pillars 10. The lateral inflated section 341 is configured so as to cover the substantially entire lateral length from the upper surface of the cowl louver 7 to the portion near the lower front surface of the front wind shield 9 when inflation of the airbag 340 is completed.

Then, the pedestrian airbag system M4 according to the fourth embodiment is mounted to the vehicle V in the following manner. The inflators 335 retained by the brackets 336 is connected to the folded airbag 340. Then, the airbag 340 and the inflators 335 are accommodated in the case 327 from the opening 327a. At this time, the bolts 337 of the inflators 335 project from insertion holes 330a of the bottom wall portion 330. Then, nuts 338 are tightened to the bolts 337 projecting from the bottom wall portion 330 of the case 327, so that the inflators 335 and the airbag 340 are fixedly mounted to the case 327.

Subsequently, bolts 332 projecting from the peripheral portion of the notch 317a of the inner panel 317 are inserted into the respective insertion holes 329a formed on the flange portion 329 (front, left, and right side portions 329a, 329b, 329c). Simultaneously, the distal ends 324a of the engaging portions 324 formed on the rear edge 320b of the cover portion 320 are engaged with the rear portion 329d of the flange portion 329. Subsequently, by tightening the nuts 333 to the bolts 332 projecting from the flange portions 329, the case 327 can be fixed to the portion parallel to the peripheral edge of the cover portion 320 of the hood panel 315. Then, by fixing the hood panel 315 to the body 1 side of the vehicle V using a hinge, not shown, the pedestrian airbag system M4 can be mounted to the vehicle V.

In the pedestrian airbag system M4 according to the fourth embodiment, when the operation signal is supplied to the inflators 335 in the state of being mounted to the vehicle, inflation gas is injected from the inflators 335, and the airbag 340 is inflated while allowing inflation gas from the inflators 335 to flow therein. Then, the airbag 340 is inflated while allowing inflation gas to flow therein from the inflators 335. Subsequently, the cover portion 320 is pushed by the airbag 340 and opens to move the rear edge 320b side upward while plastically deforming the hinge portion 321. Then, the cover portion 320 is opened and the airbag 340 projects from an opening H formed rearward and upward, whereby inflation is completed as shown by chain double-dashed lines in FIGS. 20, 21 and in FIGS. 25 and 26.

Then, in the pedestrian airbag system M4 according to the fourth embodiment, the cover portion 320 covering the case 327 is formed integrally with the main panel 319 of the hood panel 315 via the plastically deformable hinge portion 321. Therefore, there is no break between the cover portion 320 and the surrounding main panel 319 on the front surface side of the hood panel 315, and hence design of the mounting portion of the pedestrian airbag system M4 is improved.

In the pedestrian airbag system M4 according to the fourth embodiment as well, the cover portion 320 opens so as to move the rear edge 320b side upward by plastically deforming the hinge portion 321 when the airbag 340 is deployed and inflated as a matter of course. Then, the airbag 340 projects through the opening H formed when the rear edge 320b side of the cover portion 320 comes apart from the upper end of the case 327. In the pedestrian airbag system M4 in this embodiment, the case 327 for accommodating the airbag 340 is fixed to the portion of the hood panel 315 at the periphery of the cover portion 320 (periphery of the notch 317a of the inner panel 317). The case 327 is supported at the lower surface side by the stoppers 310 extending form the cowl panel 8 as a member of the vehicle body side disposed below the rear end of the hood panel when the airbag 340 is deployed and inflated. Therefore, when the airbag 340 projects upward in the initial stage of inflation, even when a reaction force which pushes the case 327 downward, the reaction force can be received by the stopper 310. Consequently, downward movement of the case 327 can be prevented, whereby the direction in which the airbag projects 340 can be stabilized. In other words, in the fourth embodiment, the airbag 340 can be projected rearward and upward while being prevented from colliding with wipers, not shown, which are disposed so as to project upward from the cowl louver 7, and can be deployed and inflated smoothly so as to be capable of protecting the pedestrian.

Therefore, with the pedestrian airbag system M4 according to the fourth embodiment, design of the mounting portion can be improved.

In particular, in the pedestrian airbag system M4 according to the fourth embodiment, the case 327 is formed of aluminum. The case 327 is fixedly mounted to the hood panel 315 only at the front portion in the cross-section taken along the fore-and-aft direction, as shown in FIGS. 22, 23. Therefore, in the pedestrian airbag system M4 according to the fourth embodiment, rigidity of the case 327 by itself cannot be secured easily. However, with the pedestrian airbag system M4 according to the fourth embodiment, the lower side of the bottom wall portion 330 of the case 327 is supported by the rigid cowl panel 8 via the stoppers 310 when the airbag 340 is deployed and inflated. Therefore, when the airbag 340 is deployed and inflated, the case 327 is not moved downward and hence deformation of the bottom wall portion 330 of the case 327 can be restrained reliably. Consequently, deformation of the bottom wall portion 330 side is restrained in the initial stage of inflation of the airbag 340, whereby the cover portion 320 can be deformed reliably. Then, the airbag 340 can be projected smoothly from the opening H which is formed when the cover portion 320 is deformed.

In the pedestrian airbag system M4 of this embodiment, the hood panel 315 and the case 327 are formed of aluminum, so that the rear wall portion 328a of the case 327 is deformed when the airbag 340 is deployed and inflated. Therefore, the opening H formed when the cover 320 opens can preferably be enlarged by the amount corresponding to the opening of the rear wall portion 328a. When such a point need not be considered, the hood panel and the case can be formed of steel as a matter of course. In other words, the case in which the rear wall portion is not deformed when the airbag is inflated can also be used. However, since aluminum is soft in comparison with steel, and hence can easily be deformed, it is preferable to form at least the hood panel from aluminum for easy deformation of the hinge portions 321.

In the pedestrian airbag system M4 according to the fourth embodiment, the cover portion 320 includes only the outer panel 316. However, the structure of the cover portion is not limited thereto. A cover portion including the outer panel and the inner panel can be used as long as it has a structure in which the case is fixed to the peripheral edge of the cover portion.

The pedestrian airbag system M4 according to the fourth embodiment, the hinge portion 321 cut out to have a recess groove is disposed as the center of rotation when the cover portion 320 is opened. However, the shape of the hinge device is not limited thereto. For example, since the portion of the outer panel near the connecting (welded) portion between the inner panel and the outer panel of the hood panel is subjected to concentration of stress, it is also possible to provide the hinge device at the portion of the outer panel near the rear edge of the connecting portion. When the structure in which the recessed groove 322 is provided as the hinge portion 321 is used according to the embodiment, a structure in which one or a plurality of band-shaped connecting members 344 connected to the main panel 319 side and the cover body 320 side in the fore-and-aft direction thereof are provided on the lower side of the recess groove 322 as shown by a chain double-dashed line in FIG. 22 so as to prevent breakage of the portion of the recessed groove 322 may be employed.

Furthermore, in the pedestrian airbag system M4 according to the fourth embodiment, the lower surface of the bottom wall portion 330 of the case 327 is supported by the cowl louver 8 via the stopper 310. However, it is also possible to omit the stopper 310, and to make the lower surface of the bottom wall portion 330 of the case 327 supported directly by the flange portion of the cowl panel 8, as a matter of course.

The invention claimed is:

1. A pedestrian airbag system comprising:

a hood panel formed of sheet metal;

an airbag accommodated in the vicinity of the rear end of the hood panel in the folded manner so as to be capable of deploying and being inflated upward by allowing inflation gas to be supplied; and a case for accommodating the airbag, wherein the case is accommodated in a storage recess formed by depressing the portion at the rear end of the hood panel downward so that the portion is opened up above and to the rear at least, and so that the bottom of the storage recess supports the bottom of the case.

2. A pedestrian airbag system according to claim 1, wherein the hood panel includes an outer panel on the upper surface side and an inner panel which is disposed below the outer panel, both of which are formed of sheet metal, and has a higher rigidity than the outer panel for supporting the outer panel, and the storage portion is formed by depressing the outer panel and the inner panel together.

* * * * *